US012626709B2

(12) United States Patent
Chen et al.

(10) Patent No.: US 12,626,709 B2
(45) Date of Patent: May 12, 2026

(54) AUDIO SUPER RESOLUTION

(71) Applicant: Zoom Video Communications, Inc., San Jose, CA (US)

(72) Inventors: Yuhui Chen, San Jose, CA (US); Zhaofeng Jia, Saratoga, CA (US); Qiyong Liu, Singapore (SG); Zhengwei Wei, Nanchang (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/515,486

(22) Filed: Oct. 31, 2021

(65) Prior Publication Data

US 2023/0110255 A1 Apr. 13, 2023

(51) Int. Cl.
*G10L 19/02* (2013.01)
*G10L 25/21* (2013.01)
*G10L 25/30* (2013.01)

(52) U.S. Cl.
CPC .............. *G10L 19/02* (2013.01); *G10L 25/21* (2013.01); *G10L 25/30* (2013.01)

(58) Field of Classification Search
CPC ................................ G10L 19/02; G10L 25/30
See application file for complete search history.

(56) References Cited

U.S. PATENT DOCUMENTS

2010/0057476 A1* 3/2010 Sudo ..................... G10L 21/038 704/500
2011/0288873 A1* 11/2011 Nagel ................... G10L 21/038 704/500
2013/0044647 A1* 2/2013 Grancharov ............ G10L 25/69 370/260
2014/0122065 A1* 5/2014 Daimou ................. H04B 1/667 704/205
2015/0288824 A1* 10/2015 Quiers .................. H04L 65/762 370/260
2019/0325887 A1* 10/2019 Karkkainen ..... G10K 11/17827
2020/0020347 A1* 1/2020 Gampp ............... G10L 21/0232
2022/0101872 A1* 3/2022 Kumar ................... G06N 3/045
2023/0105508 A1* 4/2023 Xia ..................... G10L 19/0204 704/500

(Continued)

OTHER PUBLICATIONS

Eskimez, S. E., & Koishida, K. (2019, May). Speech super resolution generative adversarial network. In ICASSP 2019-2019 IEEE International Conference on Acoustics, Speech and Signal Processing (ICASSP) (pp. 3717-3721). IEEE.*

(Continued)

*Primary Examiner* — Bryan S Blankenagel
(74) *Attorney, Agent, or Firm* — Kilpatrick Townsend & Stockton LLP

(57) ABSTRACT

Methods, systems, and apparatus, including computer programs encoded on computer storage media relate to a method for audio super resolution. The system receives an audio signal. When the sampling rate of the audio signal is below a sampling rate threshold or the frequency range of the audio signal is below a frequency range threshold, the audio signal is input to an audio super resolution model comprising a machine learning model. The audio signal is processed by the audio super resolution model to generate a synthetic audio signal with a wider frequency range than the frequency range of the audio signal.

20 Claims, 19 Drawing Sheets

300

(56) References Cited

U.S. PATENT DOCUMENTS

| | | | | |
|---|---|---|---|---|
| 2023/0306975 | A1* | 9/2023 | Fuchs | G10L 25/78 |
| 2024/0021210 | A1* | 1/2024 | Biswas | G10L 21/0208 |
| 2024/0153514 | A1* | 5/2024 | Osman | G10L 21/02 |

OTHER PUBLICATIONS

Kuleshov, V., Enam, S. Z., & Ermon, S. (2017). Audio super resolution using neural networks. arXiv preprint arXiv:1708.00853.*

Li, S., Villette, S., Ramadas, P., & Sinder, D. J. (2018, April). Speech bandwidth extension using generative adversarial networks. In 2018 IEEE International Conference on Acoustics, Speech and Signal Processing (ICASSP) (pp. 5029-5033). IEEE.*

Tagliasacchi, Marco, Yunpeng Li, Karolis Misiunas, and Dominik Roblek. "SEANet: A multi-modal speech enhancement network." arXiv preprint arXiv:2009.02095 (2020).

Kumar, Kundan, Rithesh Kumar, Thibault de Boissiere, Lucas Gestin, Wei Zhen Teoh, Jose Sotelo, Alexandre de Brébisson, Yoshua Bengio, and Aaron Courville. "Melgan: Generative adversarial networks for conditional waveform synthesis." arXiv preprint arXiv:1910.06711 (2019).

Zeghidour, Neil, Alejandro Luebs, Ahmed Omran, Jan Skoglund, and Marco Tagliasacchi. "SoundStream: An End-to-End Neural Audio Codec." arXiv preprint arXiv:2107.03312 (2021).

* cited by examiner

400

500

800

1100

1200

AUDIO SUPER RESOLUTION

FIELD

This application relates generally to audio processing, and more particularly, to systems and methods for improving audio quality through frequency bandwidth extension.

SUMMARY

The appended claims may serve as a summary of this application.

DETAILED DESCRIPTION OF THE DRAWINGS

Figure 1A:
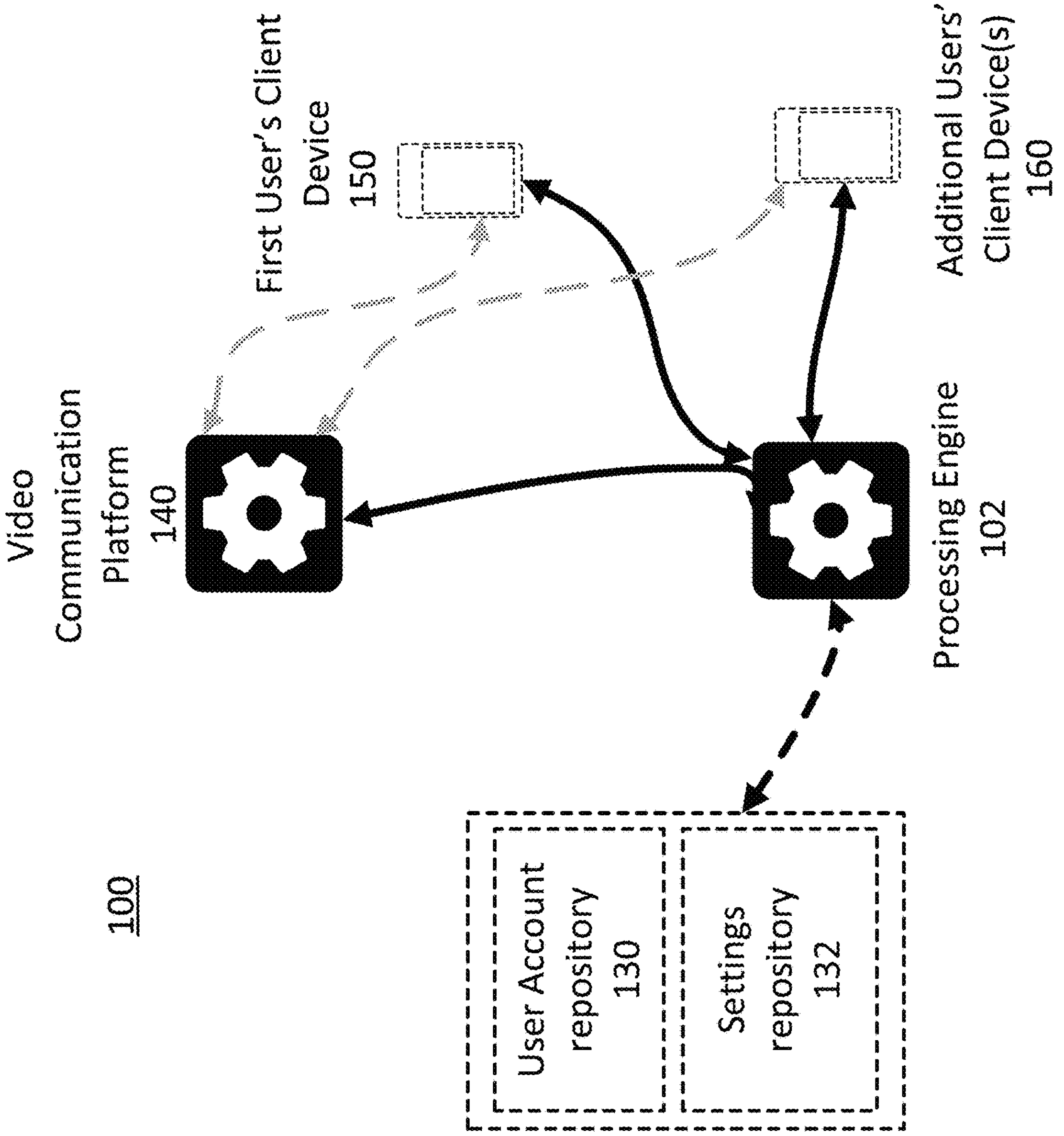
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

In general, one innovative aspect of the subject described in this specification can be embodied in systems, computer readable media, and methods that include operations for audio super resolution.

One system may receive an audio signal, such as during a video conference or other application. The system may evaluate the sampling rate or frequency range of the audio signal to determine whether to apply an audio super resolution model, such as due to the audio signal lacking content in a high frequency range. Based on this determination, the audio signal may be input to the audio super resolution model for processing. The audio super resolution model may comprise a machine learning model, such as a neural network and optionally one or more encoders and decoders. The audio super resolution model may dynamically upsample the audio signal to add content in a high frequency portion of the audio signal, such as based on one or more neural network parameters.

The system may be trained using a generative adversarial network (GAN) or other methods such as supervised or unsupervised learning. In some embodiments, system is trained using loss functions in the time and/or frequency domain and based on adversarial loss. In an embodiment, the system may be trained to differentiate between noise and non-noise content in an audio signal and upsample the non-noise content without upsampling the noise. In an embodiment, the system may be trained to upsample an audio signal that is in a frequency range below a narrowband frequency threshold, such as due to containing a frequency gap between the audio signal content and the top range of the narrowband frequency.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130 and/or a settings repository 132. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 1300, 1400, 1500, 1600, or other methods herein and, as a result, provide for audio super resolution. In some embodiments, this may be accomplished via communication with the first user's client device 150, additional users' client device(s) 160, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 160 may perform the methods 1300, 1400, 1500, 1600, or other methods herein and, as a result, provide for audio super resolution. In some embodiments, this may be accomplished via communication with the first user's client device 150, additional users' client device(s) 160, processing engine 102, video communication platform 140, and/or other device(s) over a network between the device(s) and an application server or some other network server.

The first user's client device 150 and additional users' client device(s) 160 may be devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, webinar, or any other suitable video presentation) on a video communication platform. The additional users' client device(s) 160 may be configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 160 are computing devices capable of hosting and executing one or more applications or other programs capable of sending and/or receiving information. In some embodiments, the first user's client device 150 and/or additional users' client device(s) 160 may be a computer desktop or laptop, mobile phone, video phone, conferencing system, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130 and settings repository 132. The user account repository may store and/or maintain user account information associated with the video communication platform 140. In some embodiments, user account information may include sign-in information, user settings, subscription information, billing information, connections to other users, and other user account information. The settings repository 132 may store and/or maintain settings associated with the communication platform 140. In some embodiments, settings repository 132 may include audio super resolution settings, audio settings, video settings, video processing settings, and so on. Settings may include enabling and disabling one or more features, selecting quality settings, selecting one or more options, and so on. Settings may be global or applied to a particular user account.

Video communication platform 140 comprises a platform configured to facilitate video presentations and/or communication between two or more parties, such as within a video conference or virtual classroom. In some embodiments, video communication platform 140 enables video conference sessions between one or more users.

Exemplary environment 100 is illustrated with respect to a video communication platform 140 but may also include other applications such as audio calls, audio recording, video recording, podcasting, and so on. Systems and methods herein for audio super resolution may be used in software applications for audio calls, audio recording, video recording, podcasting, and other applications in addition to or instead of video communications.

Figure 1B:
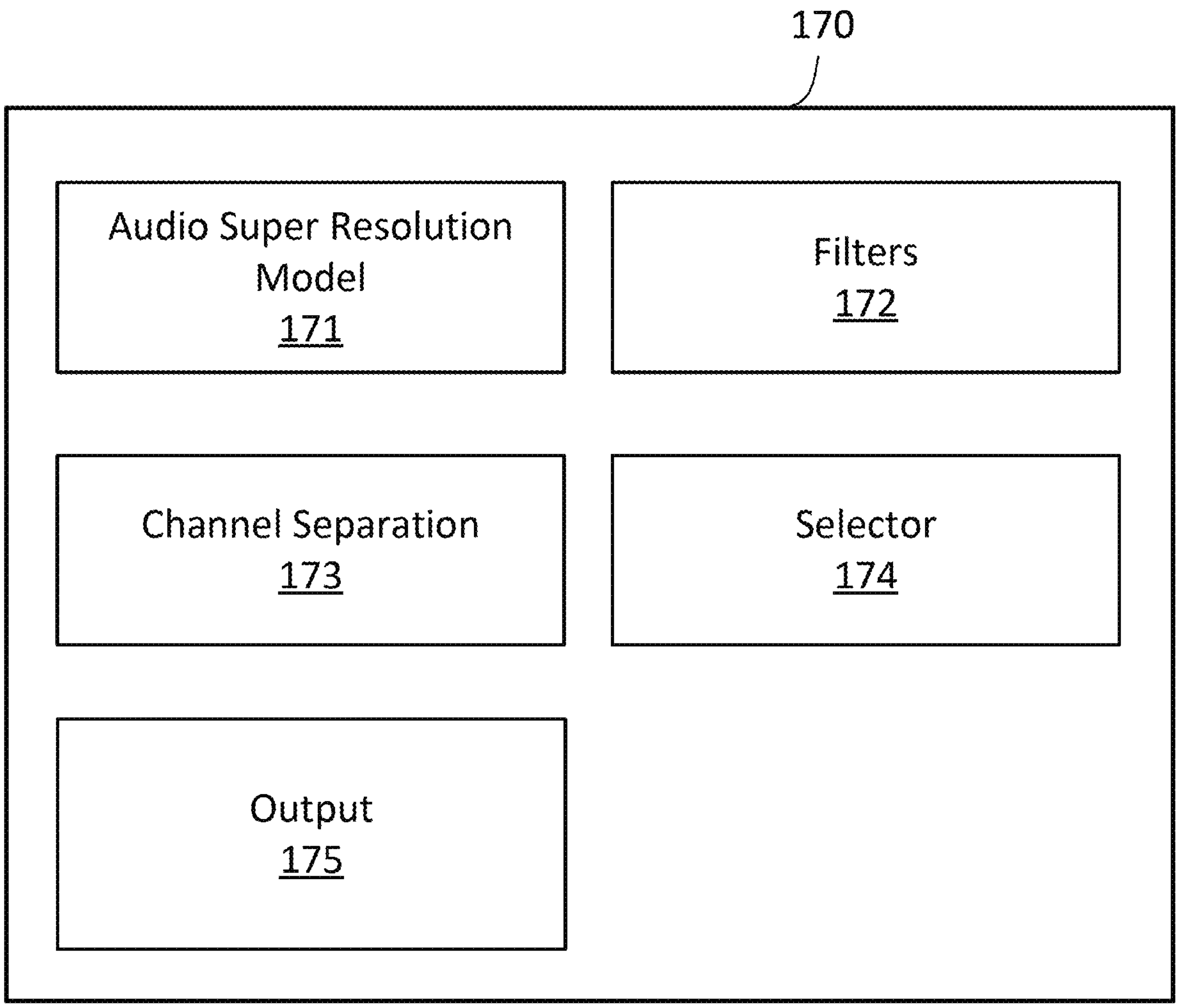
FIG. 1B is a diagram illustrating an exemplary computer system with software and/or hardware modules that may execute some of the functionality described herein.

FIG. 1B is a diagram illustrating an exemplary computer system 170 with software and/or hardware modules that may execute some of the functionality described herein. Computer system 170 may comprise, for example, a server or client device with audio super resolution functionality.

Audio super resolution model 171 provides system functionality for audio super resolution, which may comprise bandwidth extension that expands the frequency range of an audio signal in which it contains audio content. For example, audio super resolution may comprise dynamically upsampling an audio signal to a wider bandwidth. In an embodiment, audio super resolution model 171 may receive an input audio signal with content in a low frequency range and lacking content in a high frequency range and may generate audio content in the high frequency range to add to the input audio signal to increase the frequency range in which it contains content. Audio super resolution may increase the audio quality as perceived by the user of a video conferencing application or other audio application.

Audio signals may include a low frequency portion, comprising the portion of the signal in a low frequency range, and a high frequency portion, comprising the portion of the signal in a high frequency range. In some embodiments, input audio signals from telephony, Bluetooth, or oversuppressed audio systems may comprise 8 kHz narrowband signals that include content in a low frequency portion below 4 kHz and not include content in a high frequency portion higher than 4 kHz. The narrowband audio signals may be the result of a lower sampling rate, such as an 8 kHz sampling rate, where the effective frequency range of an audio signal may be half or less of the sampling rate. The audio quality of the 8 kHz signals may be less than desirable and may be improved by audio super resolution module 171 adding content in the high frequency portion, such as above 4 kHz, to extend the signal to comprise a 16 kHz, 32 kHz, 44.1 kHz, 48 kHz, or higher sampling rate wideband signal. Audio super resolution module 171 is not limited to extending a 8 kHz audio signal to 16 kHz and may be used to extend other audio signals as well, such as from an 8 kHz audio signal to a 32 kHz audio signal, from a 16 kHz audio signal to a 32 kHz audio signal, or other frequency ranges. In each case, audio super resolution model 171 generates content in the higher frequency range to add to the input audio signal to dynamically upsample the audio signal and extend its bandwidth. A low frequency portion is not limited to the range less than 4 kHz and can comprise portions at other frequency ranges such as less than 8 kHz and less than 16 kHz, and a high frequency portion is not limited to the range between 4 kHz to 8 kHz and can comprise portions at other frequency ranges such as 8 kHz to 16 kHz and 16 kHz to 32 kHz.

Audio super resolution model 171 may comprise a neural network, such as a convolutional neural network (CNN), deep neural network (DNN), and other types of neural networks. Audio super resolution model 171 may include one or more parameters, such as internal weights of the neural network, that may determine the operation of the audio super resolution model 171. Parameters may be learned by training the audio super resolution model 171 using an audio super resolution training platform 180, which may comprise hardware and/or software.

Filters 172 provide system functionality for filtering an audio signal. Filters may include low-pass filters, high-pass filters, band-stop filters, combined and complex filters, and other filters.

Channel separation module 173 provides system functionality for separating an audio stream containing audio content from multiple channels into separate streams each containing the audio content from a single channel. In some embodiments, video communication platform 140 may combine audio signals received from a plurality of client devices 150, 160 and transmit the combined audio signal to the client devices 150, 160 for output. The combined audio signal may comprise audio signals some of which are narrowband and others of which are wideband. Client devices 150, 160 may use channel separation module 173 to separate the combined audio stream into separate audio streams corresponding to the audio from a single client device. Client devices 150, 160 may then determine whether each individual stream is narrowband or wideband and determine whether to process the audio stream with audio super resolution model 171.

Selector 174 provides system functionality for analyzing an audio signal to determine whether to apply audio super resolution model 171. In an embodiment, selector 174 may determine a sampling rate of the audio signal and compare the sampling rate to a sampling rate threshold. Selector 174 may determine a frequency range of the audio signal and compare the frequency range to a frequency range threshold. When the sampling rate is below the sampling rate threshold or the frequency range is below a frequency range threshold, the selector 174 may output a decision to input the audio signal to the audio super resolution model 171. When the sampling rate is above the sampling rate threshold and the frequency range is above the frequency range threshold, the selector 174 may output a decision to pass on the audio signal for output without processing by the audio super resolution model 171.

Output 175 provides system functionality for outputting an audio signal. For example, output 175 may comprise audio drivers and speakers, headphones, or other audio output devices.

Figure 1C:
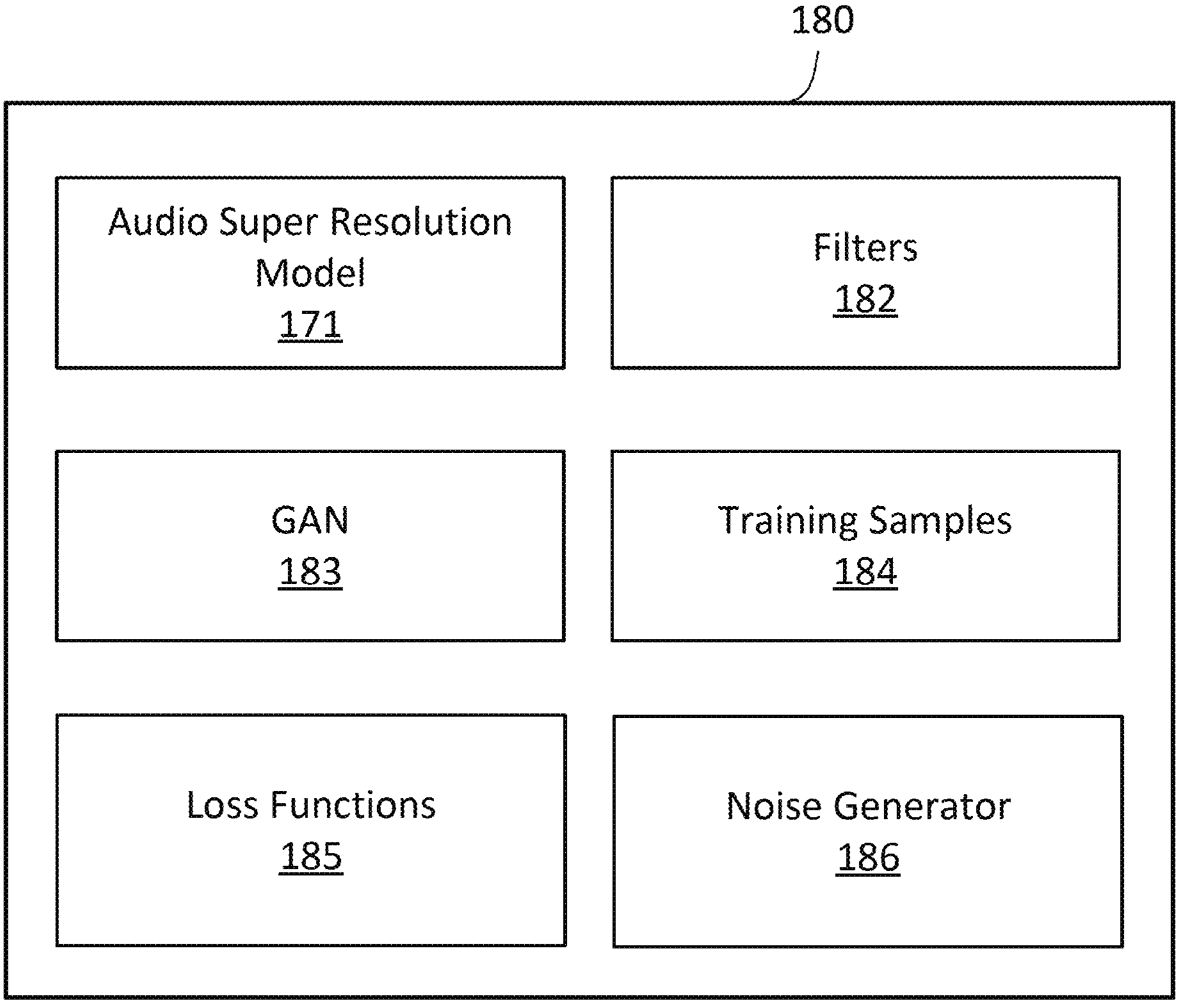
FIG. 1C is a diagram illustrating an exemplary audio super resolution training platform.

FIG. 1C is a diagram illustrating an exemplary audio super resolution training platform 180, which may comprise a computer system with software and/or hardware modules that may execute some of the functionality described herein.

Audio super resolution model 171 provides system functionality for audio super resolution as described with respect to exemplary computer system 170. After training audio super resolution model 171 on audio super resolution training platform 180, the model may be deployed on an exemplary computer system 170.

Filters 182 provide system functionality for filtering an audio signal as described with respect to exemplary computer system 170.

GAN 183 provides system functionality for training the audio super resolution model 171. GAN 183 may comprise the audio super resolution model 171 and a discriminator. The discriminator may comprise a machine learning model, such as a neural network, that evaluates a generated audio signal of the audio super resolution model 171 to determine whether the generated audio signal comprises real-world data or generated data. The discriminator may be trained to increase its accuracy in differentiating between real-world data and generated data, and the audio super resolution model 171 may be trained to generate audio signals that more closely mimic real-world data so that it is more difficult for the discriminator to correctly differentiate between a generated audio signal and a real-world audio signal comprising real-world data. In addition to GAN 183, other training systems may also be used for training audio super resolution model 171 such as supervised and unsupervised learning.

Training samples 184 may comprise one or more data samples for inputting to GAN 183 or other training systems for training the audio super resolution model 171. In one embodiment, each training sample may comprise a pair of data samples including an input audio signal and a ground truth audio signal. The input audio signal may comprise an audio signal for inputting to the audio super resolution model 171 and ground truth audio signal may comprise a target output of the audio super resolution model 171 when the input audio signal is input. For example, the input audio signal may comprise a narrowband signal and the ground truth audio signal may comprise a wideband signal. The difference between the generated audio signal when the input audio signal is input to the audio super resolution model 171 and the ground truth audio signal may be computed using loss functions 185 and be used for training the model 171 using GAN 183.

Loss functions 185 may comprise one or more objective functions that may be used for training audio super resolution model 171. Loss functions may determine a cost based on the generated audio signal of the audio super resolution model 171, and the parameters of the audio super resolution model 171 may be updated to minimize the loss functions according to a gradient-based optimization algorithm. Training may stop when the loss functions have converged. Audio super resolution model 171 may be trained using one or more loss functions, and, in some embodiments, a loss function may comprise the combination of a plurality of loss functions such as a linear combination of loss functions where each individual loss function is weighted by a corresponding weight.

Noise generator 186 provides system functionality for generating noise. Noise may comprise, for example, static noise. Generated noise may be added to one or more training samples 184 to train audio super resolution model 171 to process noisy audio signals. In one embodiment, a training sample, comprising an input audio signal and ground truth audio signal, is provided without added noise. Noise generator 186 generates noise in a low frequency range. For example, a low pass filter or down sampling may be applied to limit the frequency range of the noise to the low frequency range. The noise may be added to the input audio signal and the ground truth audio signal so that both have noise in a low frequency range but not in the high frequency range. Audio super resolution model 171 may be trained using the training samples with added noise to train the model 171 to perform bandwidth extension on non-noise content but not on noise.

Figure 2:
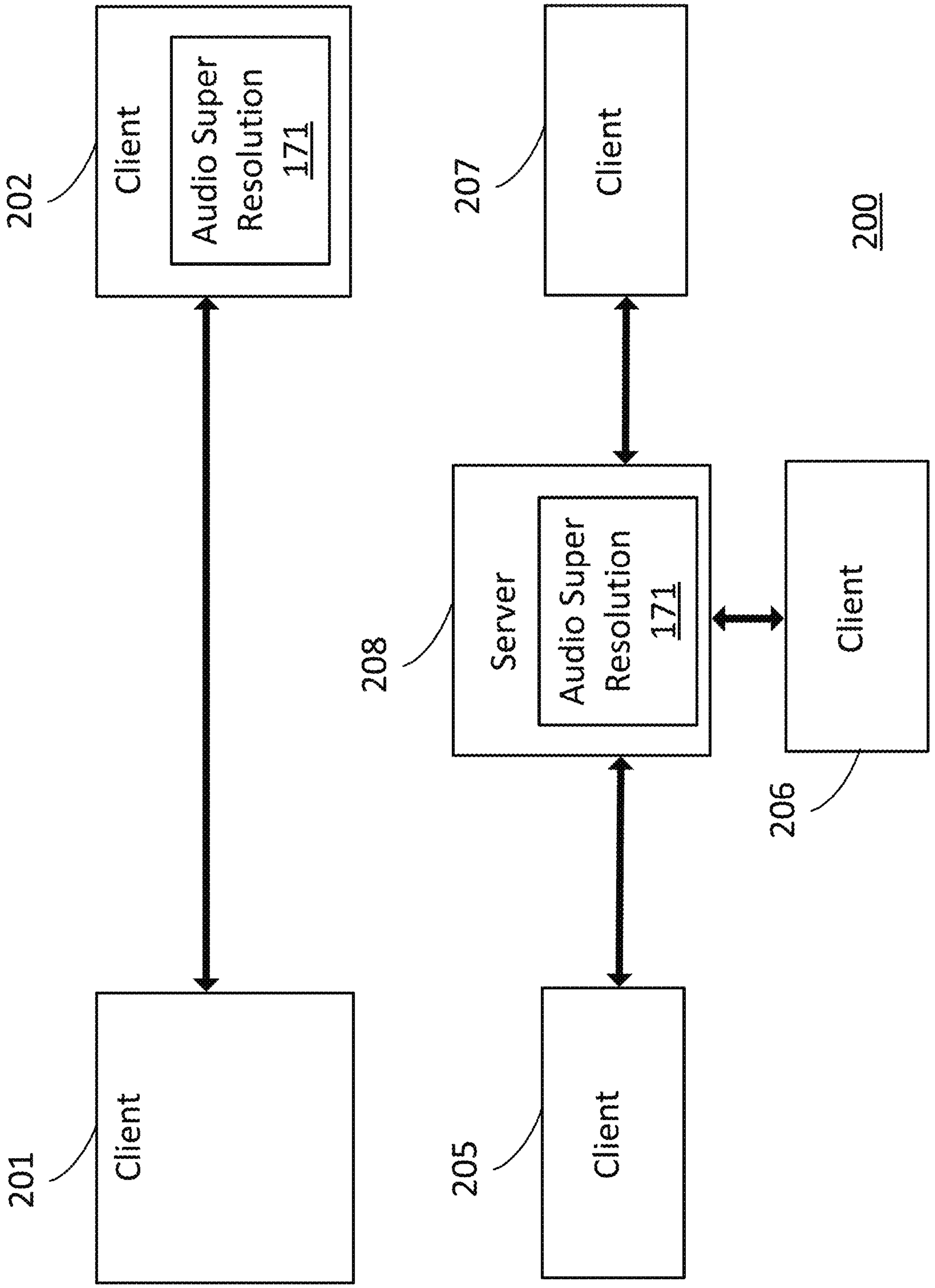
FIG. 2 is a diagram illustrating an exemplary environment including computer systems with audio super resolution functionality.

FIG. 2 is a diagram illustrating an exemplary environment 200 including computer systems with audio super resolution functionality. In exemplary environment 200, client devices 201, 202, 205, 206, 207 may comprise a computer desktop or laptop, mobile phone, video phone, conferencing system, virtual assistant, virtual reality or augmented reality device, wearable, or any other suitable device capable of sending and receiving information.

Client device 201 may communicate peer-to-peer (P2P) with client device 202. One or more of client devices 201, 202 may comprise a computer system 170 with audio super resolution functionality, including audio super resolution model 171 and filters 172, channel separation module 173, selector 174, and output 175. Audio super resolution model 171 may process audio signals received from client 201 to improve audio quality by bandwidth extension.

In some embodiments, client device 202 may receive an audio stream containing audio content from multiple channels. Client device 201, 202 may communicate via a video conferencing system provided by a server. Additional client devices may also be connected to the video conferencing system at the server. The server may combine audio streams from the different client devices, which may generate audio signals in a plurality of different audio frequency ranges, into a single audio stream. When combining audio streams, the server may upsample audio streams with a lower sampling rate so that the audio streams have the same sampling rate. However, the upsampled audio streams may be zero-filled with no content added at the higher frequency ranges. The server transmits the combined audio stream to the client device 202, which receives the audio stream from the server.

Client device 202 receives the combined audio stream with a high sampling rate from the server, but some of the channels in the audio stream have a low frequency range due to being upsampled by being zero-filled. The audio quality of these channels may be lower. In order to process the channels with a low frequency range with audio super resolution model 171, the client device 202 separates these channels out from the combined audio stream.

Channel separation module 173 analyzes the combined audio stream to determine the individual audio channels that comprise the combined audio stream. Channel separation module 173 separates the combined audio stream into the individual audio channels, which may each correspond to a single client device. Client device 202 may analyze the characteristics of each individual audio channel and perform audio super resolution on the individual audio channels that have a low frequency range to dynamically upsample them to extend their frequency range.

Client device 205 may communicate with client devices 206, 207 through server 208. Server 208 may provide, for example, a video conferencing system to client device 205, 206, 207. Server 208 may comprise a computer system 170 with audio super resolution functionality, including audio super resolution model 171 and filters 172, channel separation module 173, selector 174, and output 175. Server 208 may process audio signals received from client device 205 using audio super resolution model 171 and transmit the bandwidth extended audio signals to client devices 206, 207, and vice versa.

Client devices may produce narrowband audio signals for a variety of reasons. In some cases, audio signals transmitted by telephony, such as the Public Switched Telephone Network (PSTN), may have an 8 kHz sampling rate and frequency range not exceeding 4 kHz. Audio signals transmitted by wireless technologies, such as Bluetooth, may also have an 8 kHz sampling rate and low frequency range not exceeding 4 kHz. In other cases, client devices may have a high sampling rate but still generate content in a lower frequency range. Some client devices, including microphones, speakerphones, and smartphones, have built-in audio processing systems that may oversuppress audio content in a high frequency range. For example, de-noising systems that operate in a noisy environment may oversuppress content in the high frequency range of the audio signal that is received from the microphone of the client device. As a result, the audio signal may have a high sampling rate, such as 16 kHz, but content in the audio signal may be in a narrow frequency range below 4 kHz due to oversuppression. Each of the described narrowband audio signals may be processed with audio super resolution to extend their frequency range and perceived audio quality. As described elsewhere, methods herein can be performed not just to extend 4 kHz frequency range audio signals to 8 kHz frequency range audio signals but to extend other frequency ranges as well.

II. Exemplary Audio Super Resolution System

Generator

Figure 3:
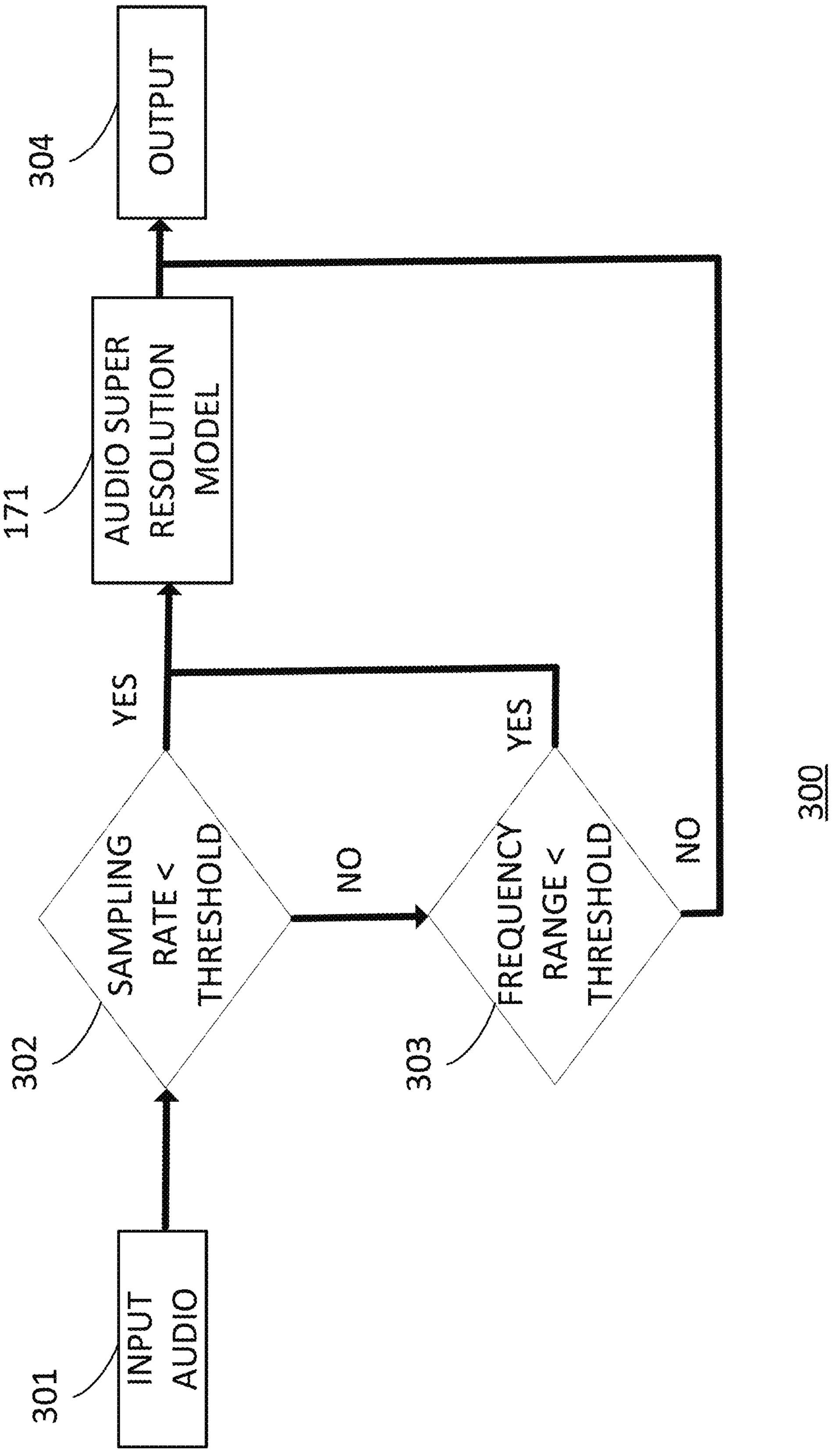
FIG. 3 is a diagram illustrating an exemplary method for selector to determine whether to use audio super resolution model.

FIG. 3 is a diagram illustrating an exemplary method 300 for selector 174 to determine whether to use audio super resolution model 171.

Input audio signal 301 is received, which may comprise audio from a video conferencing application or other audio application. Selector 174 determines the sampling rate of the input audio signal and compares the sampling rate to a sampling rate threshold (step 302). The sampling rate threshold may specify which sampling rates are too low and should have audio super resolution applied. In an embodiment, the sampling rate threshold may be 8 kHz. In other embodiments, the sampling rate threshold may be 16 kHz, 32 kHz, 44.1 kHz, 48 kHz, or other values. When the sampling rate is below the threshold, then the input audio signal 301 is transmitted to the audio super resolution model 171 for processing. For example, in one embodiment, the selector 174 determines if the sampling rate of the input audio signal 301 is 8 kHz or less, and, if so, transmits the input audio signal 301 to the audio super resolution model 171 for processing.

When the sampling rate is determined to exceed the sampling rate threshold, then the selector 174 determines the frequency range of the audio signal and compares the frequency range to a frequency threshold (step 303). In one embodiment, selector 174 determines whether the audio signal includes audio content below the frequency threshold but lacks audio content above the frequency threshold. If so, then the audio signal may have a frequency range below the frequency threshold. In one embodiment, the selector 174 may compute the ratio between the energy of a low frequency portion of the audio signal that is below the frequency threshold and the total energy of the input audio signal 301. When the ratio is above a threshold energy ratio value, then the input audio signal 301 may be determined to have a frequency range below the frequency threshold. The threshold energy ratio value may be 90%, 95%, 99%, 99.5%, or other values.

To compute the energy ratio for an input audio signal 301, the selector 174 may apply a low-pass filter to the input audio signal 301 to generate a low-pass filtered audio signal containing only the low frequency portion of the input audio signal 301 that is below the frequency threshold. The selector 174 may determine the energy of the low-pass filtered audio signal, determine the total energy of the input audio signal 301, and compute the ratio between the two values. Alternatively, selector 174 may apply a high-pass filter to the input audio signal 301 to generate a high-pass filtered audio signal containing only the high frequency portion of the input audio signal 301 that is above the frequency threshold. The selector 174 may determine the energy of the high-pass filtered audio signal, determine the total energy of the input audio signal 301, and compute the ratio between the two values. When the ratio is below a threshold energy ratio value, then the input audio signal 301 is determined to have a frequency range below the frequency threshold. The threshold energy ratio value may be 10%, 5%, 1%, 0.5%, or other values.

When the frequency range of the input audio signal 301 is below the frequency range threshold, then the input audio signal 301 is transmitted to the audio super resolution model 171 for processing.

When the sampling rate of the input audio signal 301 exceeds the sampling rate threshold and the frequency range of the input audio signal 301 exceeds the frequency range threshold, then the input audio signal 301 may be transmitted to output 304 without processing by the audio super resolution model 171.

In some embodiments, step 302 and/or step 303 may be optional. Selector 174 may evaluate the sampling rate of the input audio signal 301 and/or the frequency range of the input audio signal 301, or neither, before transmitting the input audio signal 301 to the audio super resolution model 171.

Figure 4:
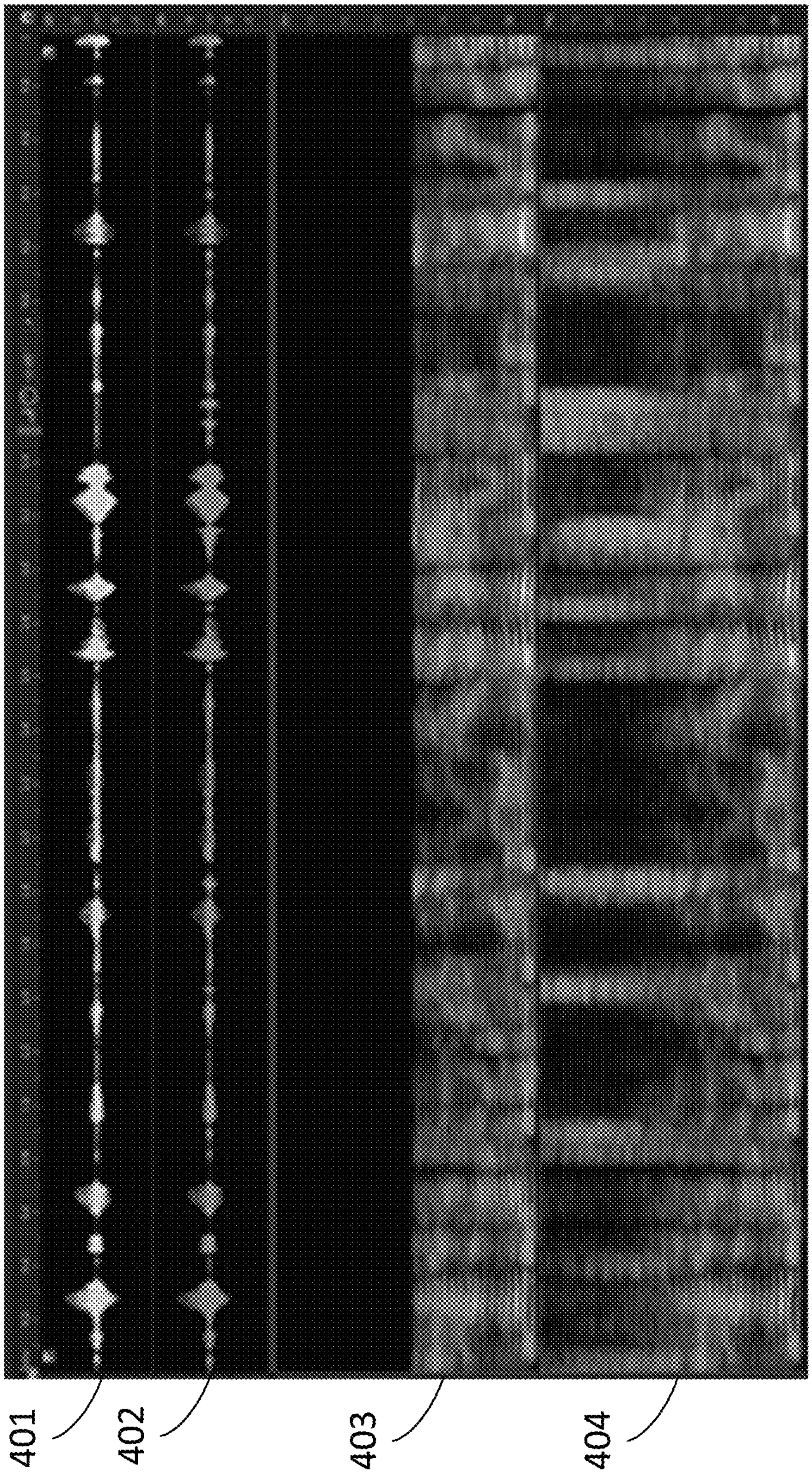
FIG. 4 is an image illustrating exemplary audio signals of the same speech with a low sampling rate and a high sampling rate.

FIG. 4 is an image 400 illustrating exemplary audio signals of the same speech with a low sampling rate and a high sampling rate. Waveform 401 shows a wave representation of a first audio signal with time on the X-axis and amplitude on the Y-axis. Waveform 402 shows a wave representation of a second audio signal. The first audio signal and second audio signal comprise the same speech.

Spectrogram 403 shows a frequency representation of the first audio signal with time on the X-axis, frequency on the Y-axis, and amplitude illustrated by pixel intensity. First audio signal has an 8 kHz sampling rate and is upsampled to a 16 kHz sampling rate, and content of the audio signal varies between 0 and 4 kHz and no content is above 4 kHz. The high frequency portion of the first audio signal between 4 kHz and 8 kHz is empty. The frequency range of the first audio signal is truncated at 4 kHz.

Spectrogram 404 shows a frequency representation of the second audio signal. Second audio signal has a 16 kHz sampling rate and the content of the audio signal varies between 0 and 8 kHz.

Selector 174 may detect that the first audio signal has a sampling rate below the sampling rate threshold in step 302. Audio super resolution model 171 may process the first audio signal to generate a synthetic audio signal that emulates the second audio signal, as described further herein.

Figure 5:
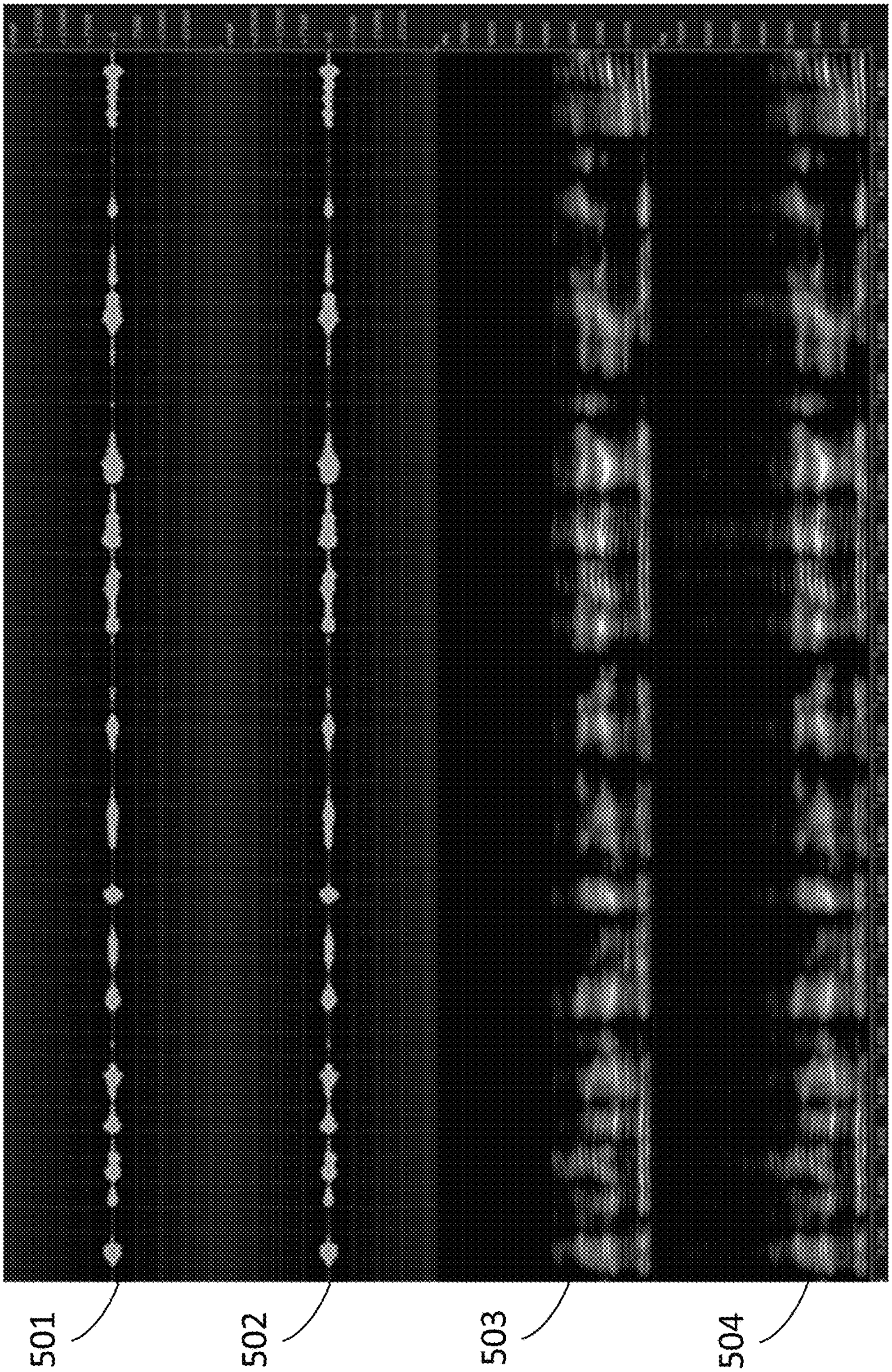
FIG. 5 is an image illustrating an exemplary audio signal with a low frequency range and a high sampling rate.

FIG. 5 is an image 500 illustrating an exemplary audio signal with a low frequency range and a high sampling rate. Waveform 501 shows a wave representation of a first audio signal with time on the X-axis and amplitude on the Y-axis. Waveform 502 shows a wave representation of a second audio signal. The first audio signal and second audio signal comprise the same speech.

Spectrogram 503 shows a frequency representation of the first audio signal with time on the X-axis, frequency on the Y-axis, and amplitude illustrated by pixel intensity. First audio signal originally has an 8 kHz sampling rate and is upsampled to 16 kHz, and content of the audio signal varies between 0 and 4 kHz and no content is above 4 kHz in the range between 4 kHz and 8 kHz.

Spectrogram 504 shows a frequency representation of the second audio signal. The second audio signal has a 16 kHz sampling rate as shown by some content of the audio signal being in the 4 kHz to 8 kHz frequency range. The amount of content above 4 kHz is small, and the energy of the content in the 4 kHz to 8 kHz frequency range is a small proportion of the total energy of the second audio signal. Second audio signal may result from oversuppression of the second audio signal by audio processing in a microphone, speaker phone, smartphone, or other device that causes the high frequency portion of the second audio signal to be suppressed. Alternatively, an audio signal with a 16 kHz sampling rate but content primarily or exclusively in the 0 to 4 kHz frequency range may result from upsampling by audio processing a computer device, which may fill the 4 kHz to 8 kHz frequency range with zero content to increase the sampling rate.

An audio signal with a high sampling rate but low frequency range, such as the second audio signal illustrated by spectrogram 504, may be evaluated by the selector 174 in step 303, where the frequency range of the audio signal is below the threshold, and transmitted to the audio super resolution model 171 for processing.

Figure 6:
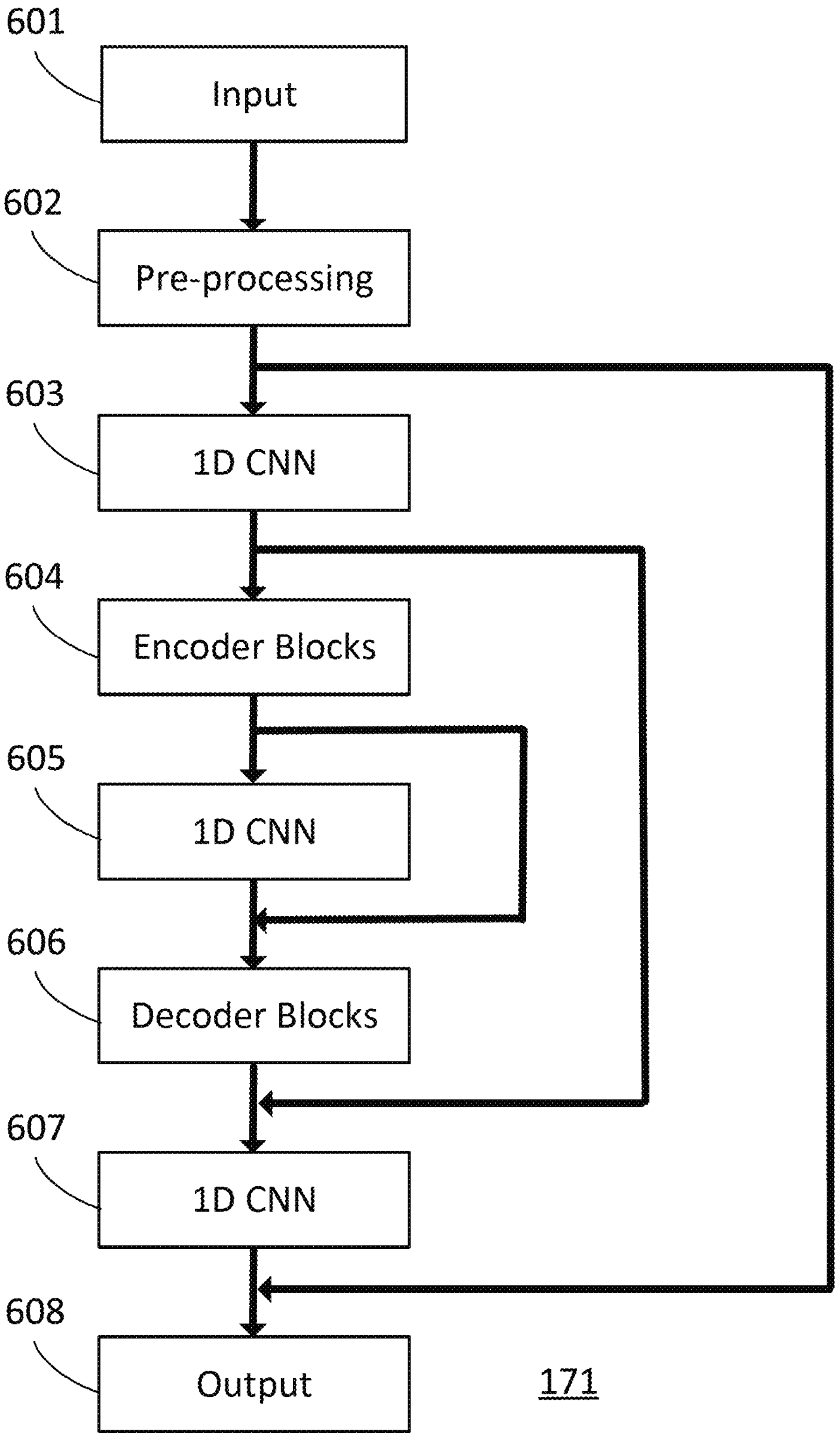
FIG. 6 is a diagram illustrating an exemplary audio super resolution model according to one embodiment of the present disclosure.

FIG. 6 is a diagram illustrating an exemplary audio super resolution model 171 according to one embodiment of the present disclosure.

Input audio signal 601 may be received and may comprise a waveform, spectrogram, or other feature representation of an audio signal. Input audio signal 601 may be received from selector 174 upon the determination by the selector 174 that the input audio signal 601 is suitable for processing by the audio super resolution model 171. Input audio signal 601 may include content in a low frequency portion of the audio signal and may not have content in a high frequency portion. In an embodiment, input audio signal 601 comprises a 8 kHz audio signal. In some embodiments, input audio signal 601 may comprise an audio signal having other frequency ranges such as 16 kHz, 32 kHz, and so on.

Input audio signal 601 is input to pre-processing module 602. In an embodiment, pre-processing module divides the input audio signal 601 into one or more audio frames. Audio frames may comprise short segments of the audio signal. In some embodiments, pre-processing module 602 may divide the audio signal at predefined intervals, such as every 10 ms, to generate the audio frames. In other embodiments, pre-processing module 602 may generate audio frames based on characteristics of the audio signal. Audio frames may be processed sequentially by the audio super resolution model 171 and recombined after processing into the generated audio signal.

Pre-processing module 602 may also remove any high frequency content in the input audio signal 601 by removing content above a frequency threshold. In an embodiment, the pre-processing module 602 may remove small frequency components above 4 kHz from the input audio signal 602 so that it is limited to content below 4 kHz. The pre-processing module 602 may determine whether the sampling rate of the input audio signal 601 is above the sampling rate threshold so that the input audio signal 601 may include a high frequency portion of content. When the sampling rate of the input audio signal 601 is above the sampling rate threshold, the pre-processing module may downsample the input audio signal 601 to a low sampling rate to remove the high frequency portion and then upsample the input audio signal 601 to a high sampling rate by zero filling the high frequency portion. For example, when the input audio signal 601 has a 16 kHz sampling rate, the pre-processing module 602 may downsample the input audio signal 601 to 8 kHz, then upsample the resulting audio signal to 16 kHz.

The output of the pre-processing module 602 is input to a one-dimensional (1D) CNN 603. The 1D CNN 603 performs a convolution operation, and the output is input to one or more encoder blocks 604.

Encoder blocks 604 may comprise neural networks that encode input data. Encoder blocks 604 may encode input data by processing the input data to generate output data that comprises a compressed digital representation of the input data. The output data may have lower dimensionality than the input data. For example, the output data may comprise a vector with lower dimensionality than the input data. In some embodiments, the output data may comprise an embedding.

The output of the encoder blocks 604 is input to a 1D CNN 605. The 1D CNN 605 performs a convolution operation, and the output is input to one or more decoder blocks 604. Decoder blocks 606 may comprise neural networks that decode input data. Decoder blocks 606 may perform the inverse operation to encoder blocks 604. Decoder blocks 606 may decode input data by processing the input data to generate output data that comprises an uncompressed digital representation of the input data. The output data may have higher dimensionality than the input data. For example, the output data may comprise a vector with higher dimensionality than the input data. In some embodiments, the input data comprises an embedding and the decoder blocks 606 expand the embedding into a higher dimensional representation.

The output of decoder blocks 606 is input to a 1D CNN 607. The 1D CNN 607 performs a convolution operation to produce output 608. Output 608 may comprise a generated audio signal that comprises a bandwidth extended version of the input audio signal 602. The generated audio signal may include content in a high frequency portion of the audio signal. The generated audio signal may comprise a waveform, spectrogram, or other feature representation of an audio signal. In an embodiment, the generated audio signal comprises an 8 kHz audio signal, 16 kHz audio signal, 44.1 kHz audio signal, or audio signal in other frequency ranges. The audio super resolution model 171 may comprise a generator network.

Audio super resolution model 171 may include one or more skip connections that feed the output of a layer further into the neural network. In an embodiment, a skip connection may be included from the pre-processing module 602 to the output 608, from the 1D CNN 603 to the 1D CNN 607, and from encoder blocks 604 to decoder blocks 606.

Figure 7:
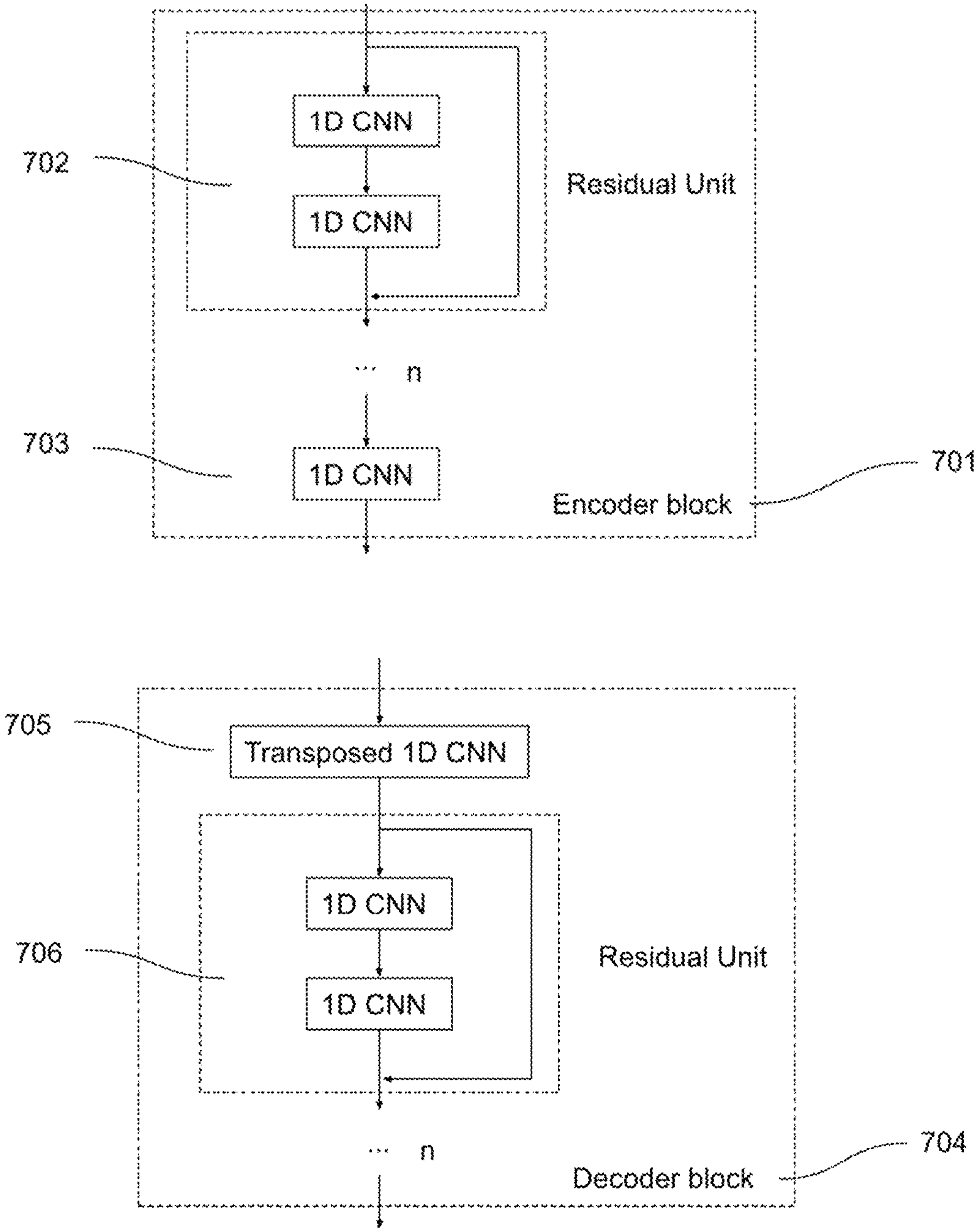
FIG. 7 is a diagram illustrating a more detailed view of encoder and decoder blocks of an exemplary audio super resolution model according to one embodiment of the present disclosure.

FIG. 7 is a diagram illustrating a more detailed view of encoder and decoder blocks of an exemplary audio super resolution model 171 according to one embodiment of the present disclosure.

The stacked encoder blocks 604 each perform an encoding step, which reduces the dimensionality of the input. In an embodiment, the number of channels of the encoder blocks 604 is doubled in each successive encoder block 701 as the input is downsampled by each encoder block 701. Each successive encoder block 701 may have twice as many channels as the encoder block preceding it. For example, the number of channels of the successive encoder blocks 604 may comprise 16, 32, 64, and 128. Stacked decoder blocks 606 each perform a decoding step, which each increase the dimensionality of the input. In an embodiment, the number of channels of the decoder blocks 606 is halved in each successive decoder block 704 as the input is upsampled by each decoder block 704. Each successive decoder block 704 may have half the number of channels as the decoder block 704 preceding it. For example, the number of channels in the successive decoder blocks 606 may comprise 64, 32, 16, and 8.

Encoder block 701 may each comprise a plurality of stacked residual units 702 that perform 1D convolutions and generate output to a 1D CNN 703. The 1D CNN 703 performs a convolution and generates output of the encoder block.

Decoder blocks 704 may each comprise a transposed 1D CNN 705 that performs a transposed 1D convolution and generates output to a plurality of residual units 706. The residual units 706 perform 1D convolutions and generate output of the decoder block.

Residual units 702, 706 may each comprise stacked 1D CNNs that perform 1D convolution. Each residual unit 702, 706 includes one or more skip connections that feed the input to output, which are shown in the diagram by arrows that skip input of the residual unit 702, 706 to be output to next layers.

The activation function used by the encoder block 701 and decoder block 704 may comprise Exponential Linear Unit (ELU), Rectified Linear Unit (ReLU), Parametric Rectified Linear Unit (PReLU), or other activation functions. The encoder block 701 and decoder block 704 may use normalization such as weight normalization, batch normalization, layer normalization, and other normalization methods.

Figure 8:
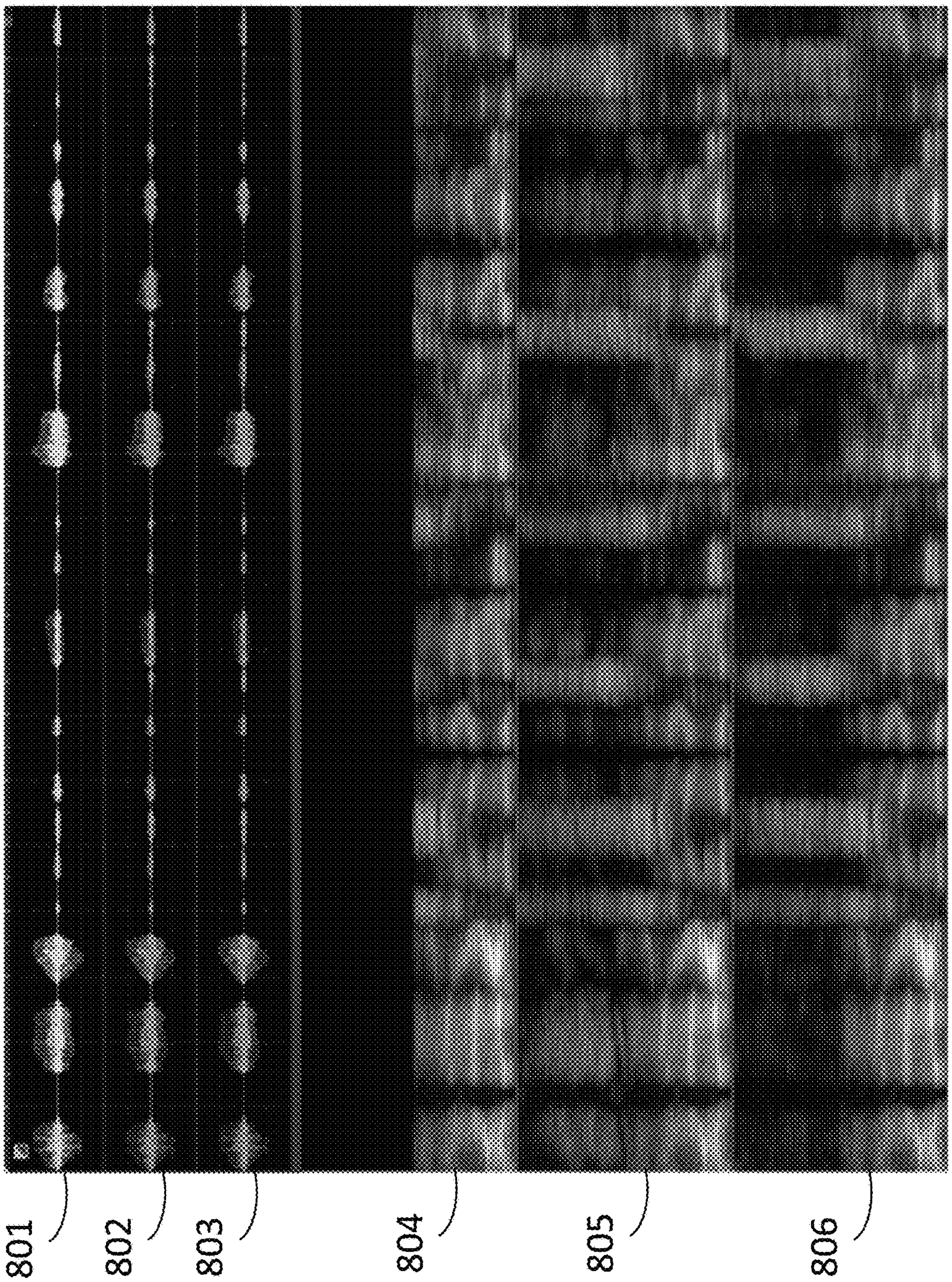
FIG. 8 is an image illustrating an exemplary input audio signal and generated synthetic audio signal of the audio super resolution module.

FIG. 8 is an image 800 illustrating an exemplary input audio signal and generated synthetic audio signal of the audio super resolution module 171. Waveform 801 shows a wave representation of an input audio signal that has a low frequency range, such as 4 kHz. Waveform 802 shows a wave representation of a ground truth audio signal that includes the same speech as the input audio signal with a wider frequency range, such as 8 kHz. Waveform 803 shows a wave representation of a generated audio signal that is generated by the audio super resolution model 171 to expand the frequency range of the input audio signal to the wider frequency range of 8 kHz.

Spectrogram 804 shows a frequency representation of the input audio signal. The input audio signal has content in the low frequency portion of the audio signal from 0 to 4 kHz and has no content in the high frequency portion of the audio signal from 4 kHz to 8 kHz. The input signal may have been recorded at a sampling rate of 8 kHz.

Spectrogram 805 shows a frequency representation of a ground truth audio signal with the same speech as the input audio signal and having a wider frequency range of 0 to 8 kHz. Content is present in the ground truth audio signal in a low frequency portion from 0 to 4 kHz and a high frequency portion from 4 kHz to 8 kHz.

Spectrogram 806 shows an exemplary generated audio signal that is output by the audio super resolution model 171 based on the input audio signal. The audio super resolution model 171 generates content in the high frequency portion of the generated audio signal based on the low frequency content of the input audio signal. The generated audio signal has a wider frequency range of 0 to 8 kHz that may improve the perceived audio quality as compared to the input audio signal while containing the same speech.

Training

Figure 9:
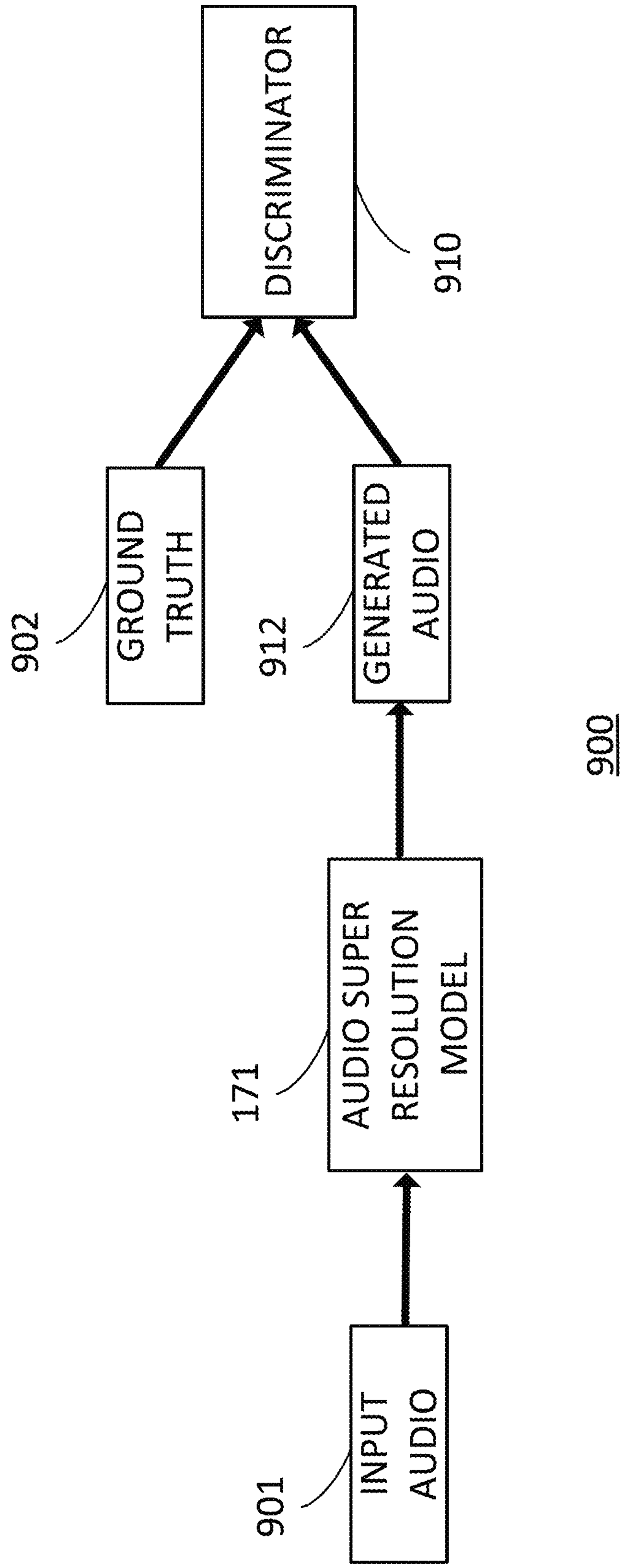
FIG. 9 is a diagram illustrating an exemplary GAN according to one embodiment of the present disclosure.

FIG. 9 is a diagram illustrating an exemplary GAN 900 according to one embodiment of the present disclosure. The audio super resolution model 171 may be trained with GAN 900 to learn and update the parameters of the audio super resolution model 171 to improve the quality of the generated audio signal.

During training with GAN 900, a training samples database comprising one or more training samples may be provided. A plurality of the training samples may be selected from the training samples database for training. Each training sample may comprise a pair of data samples including an input audio signal 901 and a ground truth audio signal 902. The input audio signal may comprise an audio signal for inputting to the audio super resolution model 171 and ground truth audio signal 902 may comprise a target output of the audio super resolution model 171 when the input audio signal 901 is input. The ground truth audio signal 902 may comprise the same speech as the input audio signal 901, where the ground truth audio signal 902 has a higher frequency range than the input audio signal 901. For example, the input audio signal 901 and ground truth audio signal 902 may comprise the same speech with 4 kHz and 8 kHz frequency ranges, respectively.

Input audio signal 901 and ground truth audio signal 902 may be generated by using several methods. In some embodiments, the ground truth audio signal 902 is provided, such as via collecting wideband audio signals from audio libraries or via data collection from recording rooms or user devices. The ground truth audio signal 902 may comprise a first frequency range that is the target frequency range for the output of the audio super resolution model 171. Wideband audio signals may comprise, for example, 8 kHz frequency range audio signals. Input audio signal 901 may be generated from the ground truth audio signal 902 by extracting a low frequency portion of the ground truth audio signal. The input audio signal 901 may comprise a second frequency range that is the input frequency range for the audio super resolution model 171. In one embodiment, the ground truth audio signal 902 is downsampled to a lower frequency range, such as 4 kHz, to generate the input audio signal 901. In one embodiment, a low-pass filter or bandstop filter may be applied to the ground truth audio signal 902 to retain content in a low frequency range, such as 4 kHz, and suppress content in a high frequency range, such as above 4 kHz, to generate the input audio signal 901. In some embodiments, a fade-out filter may be applied to the ground truth audio signal 902 to create a fade out from the audio content below a frequency threshold to the frequency threshold rather than a sharp cutoff. In some embodiments, a codec may be applied to the ground truth audio signal 902, with codec settings configured to output a lower frequency audio signal, to generate the input audio signal 901. In some embodiments, G.722 or Opus codecs may be applied to generate lower frequency audio signal. In some embodiments, a codec may be configured to record audio and output audio signals with a wider frequency range, such as 8 kHz, to use as the ground truth audio signal 902 and a narrower frequency range, such as 4 kHz, to use as the input audio signal 901. The generated input audio signal 901 and ground truth audio signal 902 may be stored as a training sample in a training samples database.

Training samples may be data filtered to ensure that the ground truth audio signals include wideband audio content. This may be used to avoid ground truth audio signals that may have a sufficiently high sampling rate but may lack content in the high frequency portion of the audio signal. For example, upsampled low frequency audio signals that have been zero-filled in the high frequency portion may be rejected as training samples. In an embodiment, a data filtering module may compute the ratio between the energy of a low frequency portion of the audio signal below a frequency threshold and the total energy of the ground truth audio signal. The ratio may be compared to a predefined ratio range, and when the ratio is within the predefined ratio range, then the ground truth audio signal may be accepted for use in a training sample. In one embodiment, the predefined ratio range may comprise 85% to 99%, such that the low frequency portion of the ground truth audio signal is detected to comprise 85% to 99% of the total energy of the audio signal to be accepted for use in a training sample.

Input audio signal 901 is input to the audio super resolution model 171 to create a generated audio signal 912. The generated audio signal 912 may have a high frequency range, such as 8 kHz, which may be the same frequency range as the ground truth audio signal 902. The generated audio signal 912 and ground truth audio signal 902 are input to discriminator 910 for the discriminator to evaluate the audio signals and determine which comprises real-world data and which comprises generated, synthetic data. Discriminator 910 may comprise a neural network, such as a DNN, that is trained to select which of the two input audio signals comprises real-world data versus generated data. The audio super resolution model 171 is trained to output generated audio signals that more closely resemble ground truth audio signals, so that the discriminator 910 is less accurate in distinguishing between the two.

The audio super resolution model 171 may be trained based on one or more loss functions 185. In an embodiment, the audio super resolution model 171 is trained by updating parameters of the model to minimize the loss functions according to a gradient-based optimization algorithm.

In one embodiment, the audio super resolution model 171 may be trained based on a reconstruction loss function that measures the difference between the generated audio signal 912 and ground truth audio signal 902. In one embodiment, the generated audio signal 912 and ground truth audio signal 902 comprise time scale audio signals, such as a waveform, and so the reconstruction loss function may comprise a time scale reconstruction loss function.

In one embodiment, the audio super resolution model 171 may be trained based on an adversarial loss function that measures the ability of the audio super resolution model 171 to create generated audio signals 912 that the discriminator 910 cannot distinguish from real-world data. The adversarial loss function may measure the ability of the audio super resolution model 171 to create generated audio signals 912 that are similar to ground truth audio signal 902.

In one embodiment, the audio super resolution model 171 may be trained based on a reconstruction loss function in the frequency domain that measures the difference between the generated audio signal 912 and ground truth audio signal 902 in the frequency domain. In an embodiment, this loss function may comprise a spectral reconstruction loss function. In one embodiment, the generated audio signal 912 and ground truth audio signal 902 are time scale audio signals, such as a waveform, and the spectral reconstruction loss function determines the difference between the generated audio signal 912 and ground truth audio signal 902 on a frequency scale. In an embodiment, the spectral reconstruction loss function is computed based on the mel spectrogram representations, or other frequency domain representations such as spectrograms, of the generated audio signal 912 and ground truth audio signal 902.

In an embodiment, the audio super resolution model 171 may be trained based on a time scale reconstruction loss function, adversarial loss function, and spectral reconstruction loss function. In an embodiment, audio super resolution model 171 may be trained based on a global loss function that comprises the sum or linear combination of the time scale reconstruction loss function, adversarial loss function, and spectral reconstruction loss function.

Exemplary global loss function $L_G$ may comprise:

$$L_G=\lambda_1 L^{rec\_t}+\lambda_2 L^{adv}+\lambda_3 L^{rec\_s}$$

Where $\lambda_1$, $\lambda_2$, and $\lambda_3$ may comprise weights. Exemplary time scale reconstruction loss function may comprise:

$$L^{rec\_t}=E_x\left[\frac{1}{KL}\sum_{k,l}\frac{1}{T_{k,l}}\sum_t\left|D_{k,t}^{(l)}(y)-D_{k,t}^{(l)}(G(x))\right|\right]$$

Where L is the number of internal layers, $$D_{k,t}^{(l)}(l\in\{1,\ldots,L\})$$

discriminator k, and $T_{k,l}$ is the length of the layer in the time dimension.

Exemplary adversarial loss function may comprise:

$$L^{adv}=E_x\left[\frac{1}{K}\sum_{k,t}\frac{1}{T_k}\max(0,1-D_{k,t}(G(x)))\right]$$

Where k∈{0, . . . , K} indexes over the individual discriminators and $T_k$ denotes the number of logits at the output of the k-th discriminator along the time dimension.

Exemplary spectral reconstruction loss function may comprise:

$$L^{rec\_s}=\sum_{s\in 2^8,\ldots,2^{11}}\sum_t\|S_t^s(x)-S_t^s(G(x))\|_1+\alpha_s\sum_t\|\log S_t^s(x)-\log S_t^s(G(x))\|_2$$

Where $$S_t^s(x)$$

is the t-th frame of a mel-spectrogram computed with window length equal to s and hop length equal to s/4 or s/2. In an embodiment, $\alpha_s=\sqrt{s/2}$ or could be a trainable variable.

Figure 10:
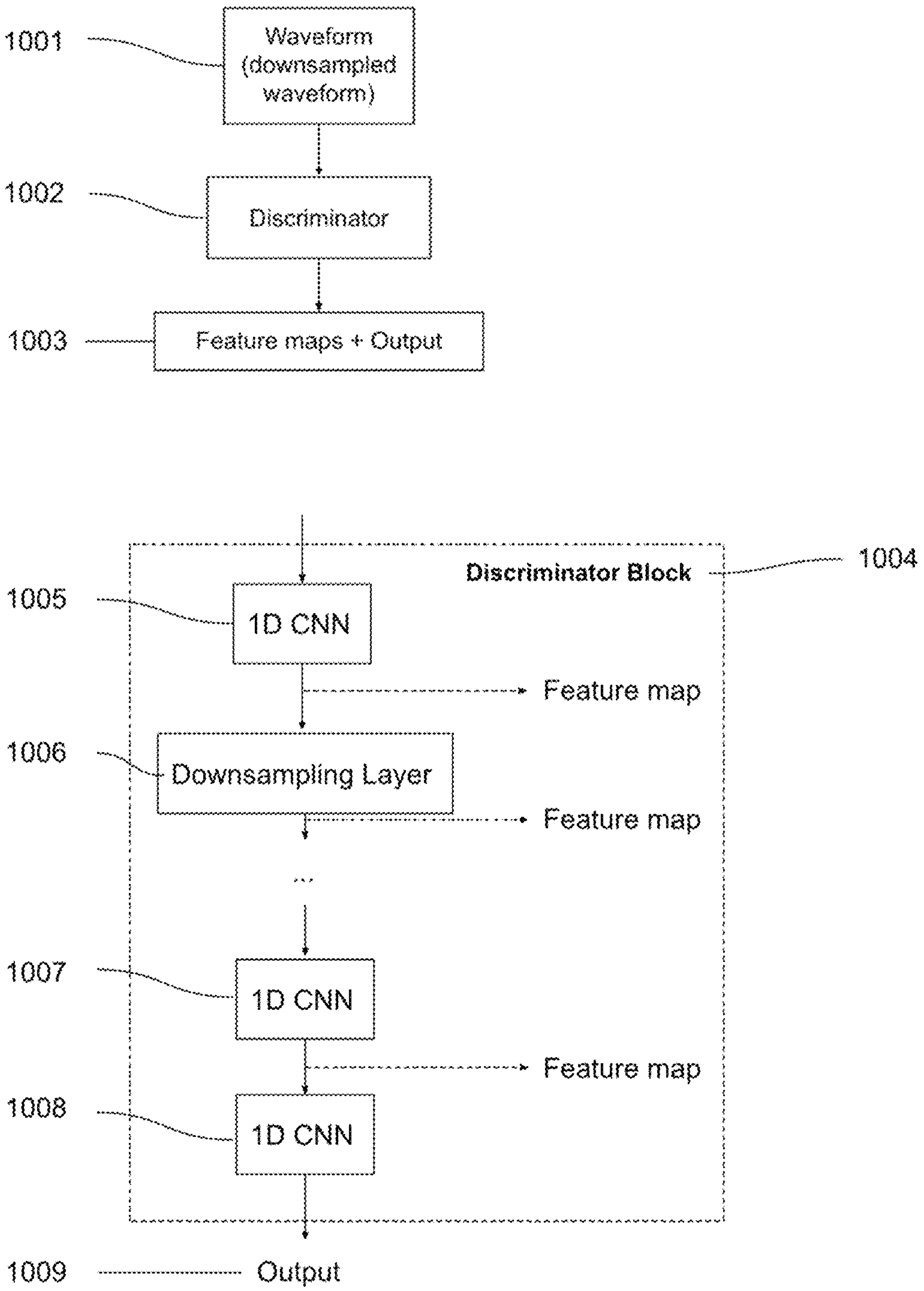
FIG. 10 is a diagram illustrating an exemplary discriminator according to one embodiment of the present disclosure.

FIG. 10 is a diagram illustrating an exemplary discriminator 910 according to one embodiment of the present disclosure.

Input audio signal 1001 may be received and may comprise a waveform, spectrogram, or other feature representation of an audio signal. In an embodiment, the discriminator 1002 may comprises plurality of discriminator blocks 1004, which comprise a multiscale architecture that operates on the input audio signal 1001 at a plurality of scales, such as at a plurality of levels of downsampling in addition to the original signal. The input audio signal 1001 may be input to discriminator 1002. The discriminator 1002 processes the input audio signal 1001 and generates feature maps and output 1003. In an embodiment, the input audio signal 1001 is also downsampled to generate input audio signals, such as downsampled by a factor of 2 and 4, respectively. The downsampled audio signals are input to discriminator 1002 to also generate feature maps and output. The downsampled audio signals may be padded before inputting to discriminator 1002 so that downsampled audio signals match the dimensions of discriminator 1002.

In each discriminator block 1004, the input audio signal may be input to a convolutional layer 1005. Convolutional layer 1005 performs a convolution operation and generates a feature map and output to a plurality of downsampling layers 1006. Each downsampling layer 1006 performs downsampling and generates downsampled feature maps and output to a convolutional layer 1007. The convolutional layer 1007 generates a feature map and output to a convolutional layer 1008. The convolutional layer 1008 generates output 1009.

The activation function used by the discriminator 1002 may comprise ELU, ReLU, Leaky ReLU, PReLU, or other activation functions. The discriminator 1002 may use normalization such as weight normalization, batch normalization, layer normalization, and other normalization methods.

Figure 11:
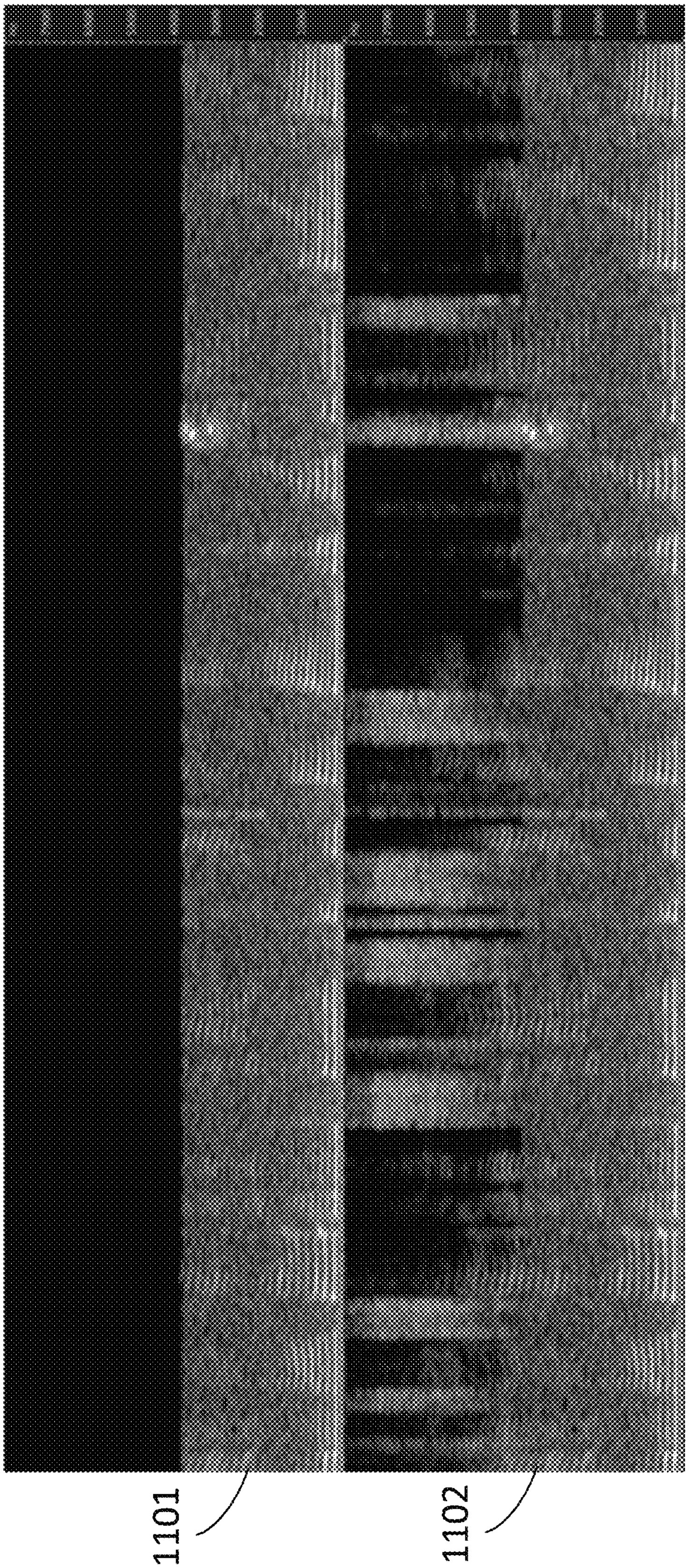
FIG. 11 is an image illustrating exemplary audio signals used for training the audio super resolution model for noisy speech.

FIG. 11 is an image 1100 illustrating exemplary audio signals used for training the audio super resolution model 171 for noisy speech.

In an embodiment, audio super resolution model 171 may be trained to generate high frequency content to expand the frequency range of non-noise content, such as speech, and not generate high frequency content for noise. The audio super resolution model 171 may determine that first content in an audio signal comprises noise and that second content in the audio signal comprises non-noise. The audio super resolution model 171 may generate a corresponding high frequency audio signal portion for the second content and not the first content. The differentiation between noise and non-noise in an audio signal may be performed via the parameters of the audio super resolution model 171.

In an embodiment, training samples may be provided to train the audio super resolution model 171 to upsample non-noise content and not upsample noise. Initial training samples may be provided without added noise. Each training sample may include an input audio signal with a low frequency range and a corresponding ground truth audio signal with a high frequency range, both audio signals containing the same speech and neither having added noise. Noise generator 186 may be used to generate static noise in the low frequency range. In an embodiment, a low pass filter may be applied to the noise to limit it to the low frequency range and suppress any noise in the high frequency range. In an embodiment, the noise may be downsampled to the low frequency range, which may suppress any noise in the high frequency range. The low frequency noise may be added to the input audio signal to generate a noisy input audio signal that includes noise in the low frequency range. Spectrogram 1101 shows a noisy input audio signal with static noise. The low frequency noise may be added to the ground truth audio signal to generate a noisy ground truth audio signal that includes noise in the low frequency range and does not have added noise in the high frequency range. Spectrogram 1102 shows a noisy ground truth audio signal with static noise in a low frequency portion of the audio signal and without added noise in a high frequency portion of the audio signal. The noisy input audio signal and noisy ground truth audio signal may comprise a noisy training sample that may be added to the training samples database for training the audio super resolution model 171.

By training the audio super resolution model 171 on one or more noisy training samples, the audio super resolution model 171 learns to generate high frequency content only for non-noise content and not for noise. In one embodiment, noise is added in the frequency range 0 to 4 kHz, comprising a low frequency audio signal portion, and not in the frequency range 4 kHz to 8 kHz, comprising a high frequency audio signal portion. The audio super resolution model 171 learns to generate content between 4 kHz and 8 kHz for non-noise content and not for noise. In some embodiments, noise may be added in other frequency ranges based on the range of bandwidth extension. For example, noise may be added between 0 and 8 kHz for bandwidth extension from 8 kHz to 16 kHz or may be added between 0 and 16 kHz for bandwidth extension from 16 kHz to 44.1 kHz.

Figure 12:
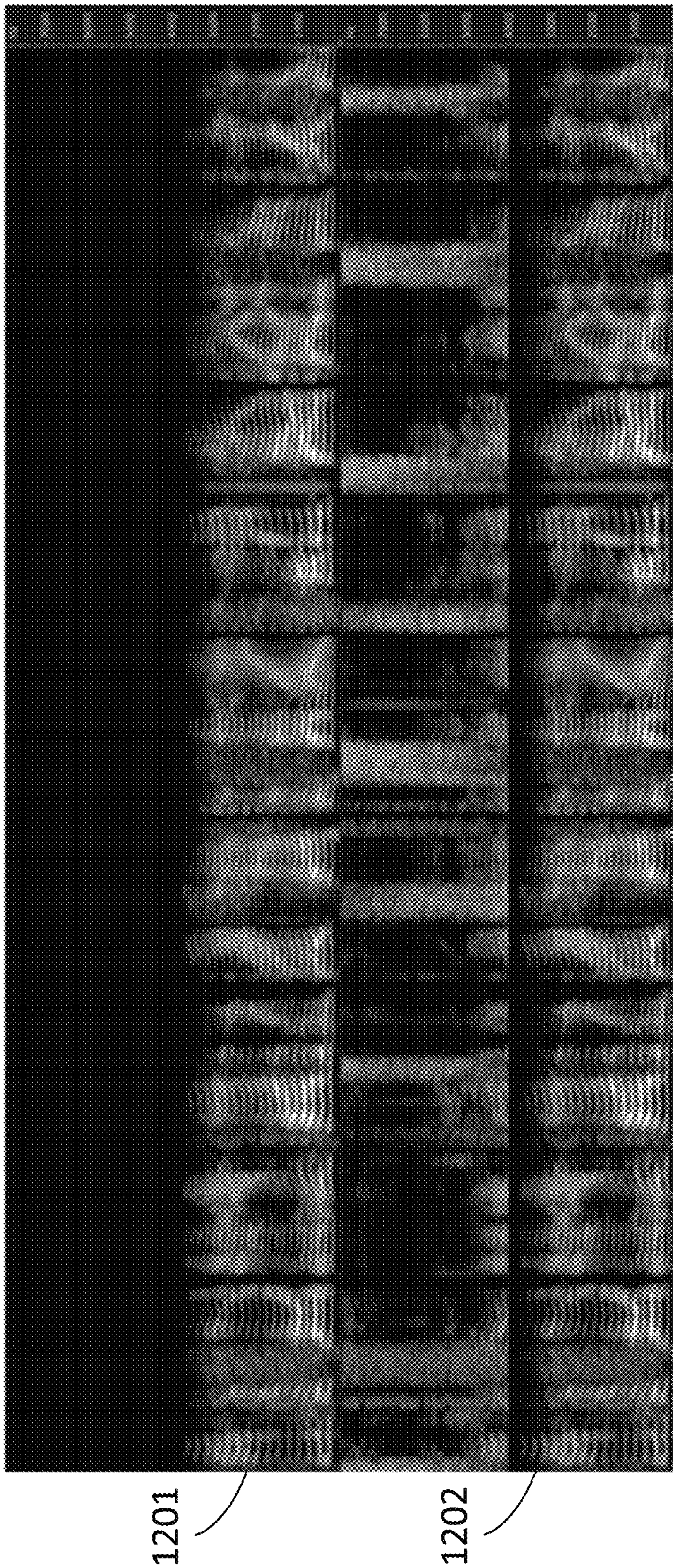
FIG. 12 is an image illustrating exemplary audio signals used for training the audio super resolution model.

FIG. 12 is an image 1200 illustrating exemplary audio signals used for training the audio super resolution model 171.

In an embodiment, audio super resolution model 171 may be trained to generate high frequency content above a frequency threshold and without low frequency content below the frequency threshold that would change the low frequency portion of the input audio signal. In an embodiment, the generated audio signal includes a low frequency portion and a high frequency portion, the input audio signal includes a low frequency portion, and the low frequency portion of the generated audio signal is the same as the low frequency portion of the audio signal.

When the audio super resolution model 171 adds high frequency content without adding low frequency content, the generated audio signal may include a gap between the high frequency content and the low frequency content of the input audio signal, for example, when the input audio signal does not include content in a frequency range near the frequency threshold. In an embodiment, the generated audio signal includes a low frequency portion, a high frequency portion, and a frequency gap comprising a frequency range between the low frequency portion and the high frequency portion without audio content.

In an embodiment, training samples used for training the audio super resolution model 171 include training samples where the input audio signal and corresponding ground truth audio signal have the same content in the low frequency portion of the audio signals. These training samples may teach the audio super resolution model 171 to output a generated audio signal that has a low frequency portion that is the same as the low frequency portion of the input audio signal. For example, as shown in image 800, the input audio signal 804, ground truth audio signal 805, and generated audio signal 806 have the same content in the low frequency range.

In an embodiment, training samples may be generated for training the audio super resolution model 171 to process input audio signal that include a frequency gap without audio content between the highest frequency content in the input audio signal and a frequency threshold that is the maximum possible frequency based on the frequency range. The training samples may teach the audio super resolution model 171 to generate audio signals that include a frequency gap between the low frequency content and the high frequency portion of the generated audio signal. In an embodiment, a ground truth audio signal is provided that includes content in a wide frequency range, such as between 0 and 8 kHz. A band-stop filter and fade out effect may be applied to the ground truth audio signal to suppress audio content close to and below a frequency threshold, such as 4 kHz. As a result, a frequency gap is created in the modified ground truth audio signal between the content in the low frequency portion, such as below 4 kHz, and the content in the high frequency portion. Spectrogram 1202 shows a modified ground truth audio signal with a frequency gap in a range close to and below 4 kHz. The low frequency portion of the modified ground truth audio signal fades out to the 4 kHz threshold. The high frequency portion of the modified ground truth audio signal does not extend below 4 kHz. The low frequency portion of the modified ground truth audio signal may be extracted to use for the corresponding input audio signal, as shown by spectrogram 1201. The input audio signal and modified ground truth audio signal may be used as a training sample pair to train the audio super resolution model 171 to process audio signals that may be lower than the frequency threshold, such as below 4 kHz, and may have a frequency gap. In image 1200, the ground truth audio signal 1202 has a frequency gap near 4 kHz, and in other embodiments, the frequency gap may be at a frequency threshold at other levels such as 8 kHz, 16 kHz, and other frequencies.

Audio super resolution model 171 learns parameters that enable it to generate audio signals that include a frequency gap. In an embodiment, the generated audio signal may include a low frequency portion that is the same as the low frequency portion of an input audio signal, which may include a frequency gap below a frequency threshold. The generated audio signal may include a high frequency portion above the frequency threshold, where the frequency gap is between the low frequency portion and high frequency portion.

III. Exemplary Methods

Figure 13:
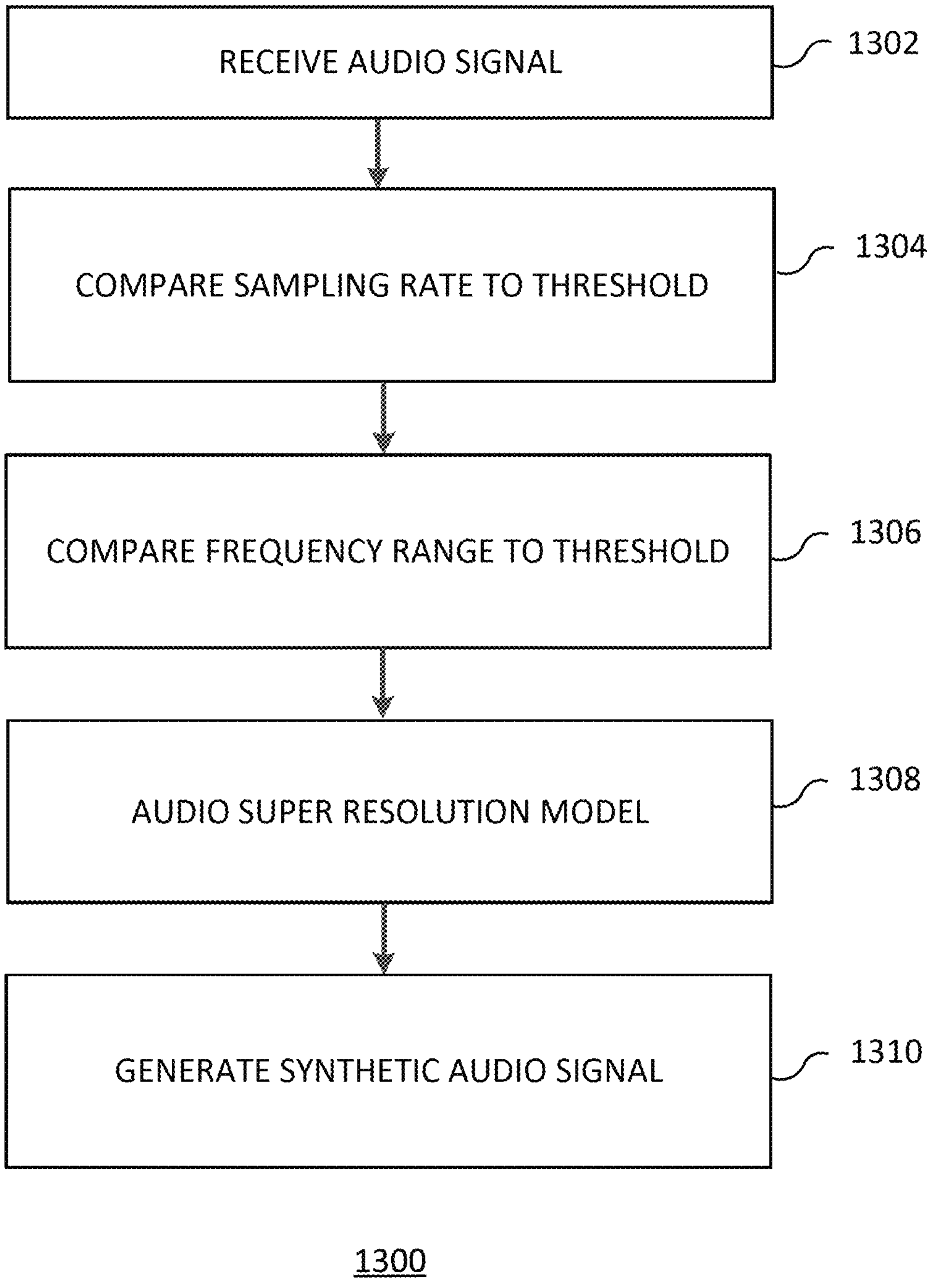
FIG. 13 illustrates an exemplary method that may be performed in some embodiments.

FIG. 13 illustrates an exemplary method 1300 that may be performed in some embodiments.

At step 1302, an audio signal is received. In an embodiment, the audio signal may be received from a video conferencing application or other audio application.

At step 1304, a sampling rate of the audio signal is determined, and the sampling rate is compared to a sampling rate threshold.

At step 1306, a frequency range of the audio signal is determined, and the frequency range is compared to a frequency range threshold. In one embodiment, the frequency range is compared to the frequency range threshold by computing the ratio between the energy of a low frequency portion of the audio signal, comprising content below the frequency range threshold, to the total energy of the audio signal. When the ratio exceeds a threshold energy ratio value, then the frequency range of the audio signal may be below the frequency range threshold.

At step 1308, when the sampling rate is below the sampling rate threshold or the frequency range is below the frequency range threshold, the audio signal is input to an audio super resolution model. The audio super resolution model may comprise a neural network. In some embodiments, the audio super resolution model may comprise a CNN including at least one encoder and at least one decoder.

At step 1310, the audio signal may be processed by the audio super resolution model to generate a synthetic audio signal. The synthetic audio signal may have a wider frequency range than the frequency range of the audio signal. In some embodiments, the synthetic audio signal may comprise a wideband version of the audio signal, where the synthetic audio signal has a frequency range of 8 kHz and the audio signal has a frequency range of 4 kHz.

Figure 14:
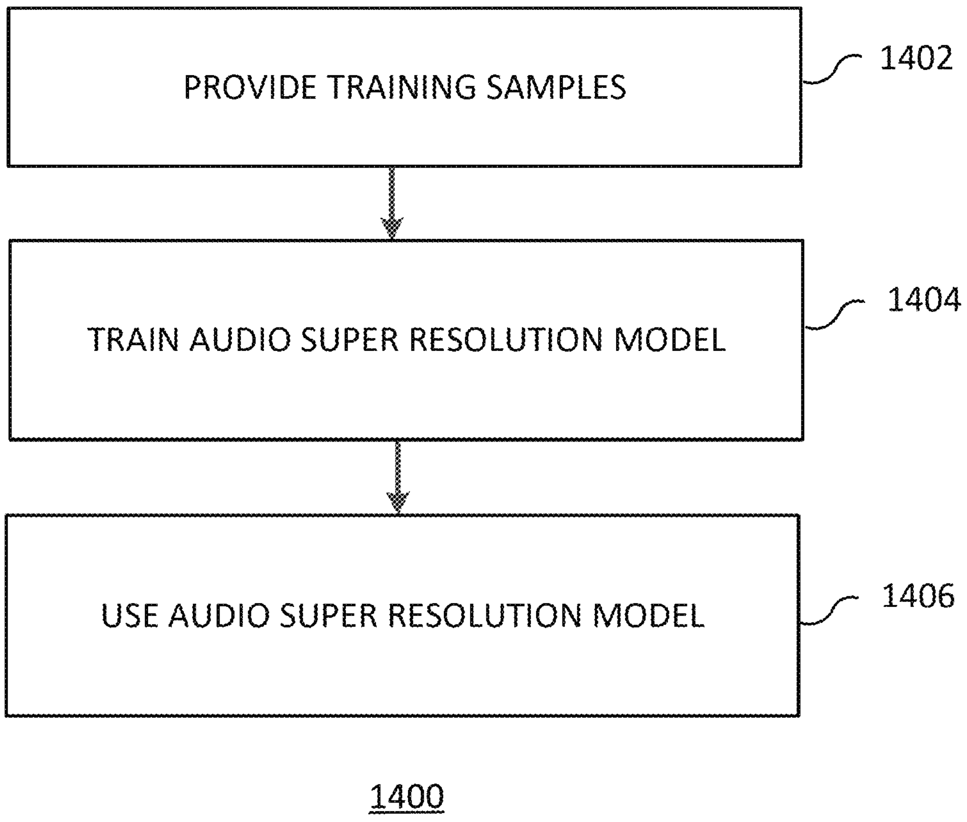
FIG. 14 illustrates an exemplary method that may be performed in some embodiments.

FIG. 14 illustrates an exemplary method 1400 that may be performed in some embodiments.

At step 1402, a database of training samples is provided. In one embodiment, each training sample may comprise a pair of data samples including an input audio signal and a ground truth audio signal. The input audio signal may comprise an audio signal for inputting to the audio super resolution model and ground truth audio signal may comprise a target output of the audio super resolution model when the input audio signal is input.

At step 1404, an audio super resolution model may be trained by inputting the training samples into a GAN and updating one or more parameters of the audio super resolution model based on a loss function. One or more loss functions may be used, such as a time scale reconstruction loss function, adversarial loss function, or spectral reconstruction loss function. A loss function may comprise a combination of loss functions such as by summation or linear combination. One or more parameters of the audio super resolution model, such as neural network weights, may be updated to minimize the loss function according to a gradient-based optimization algorithm.

At step 1406, the audio super resolution model may be used to extend the bandwidth of one or more audio signals, such as during a video conference or other audio applications.

Figure 15:
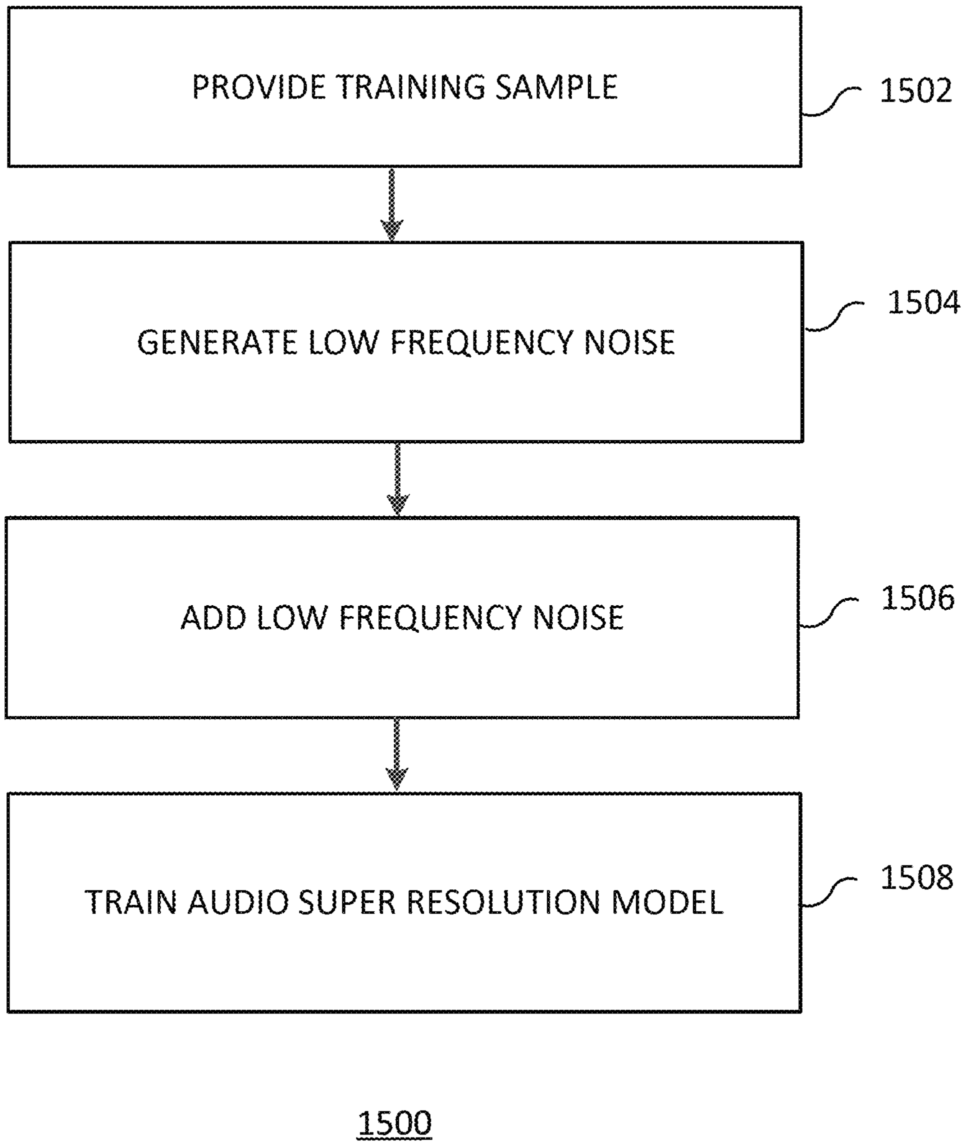
FIG. 15 illustrates an exemplary method that may be performed in some embodiments.

FIG. 15 illustrates an exemplary method 1500 that may be performed in some embodiments.

At step 1502, a training sample is provided comprising an input audio signal and a ground truth audio signal. In an embodiment, the input audio signal is a narrowband audio signal and the ground truth audio signal is a wideband audio signal and both audio signals contain the same speech.

At step 1504, noise is generated in a low frequency range by a noise generator. Noise may comprise static noise. The noise may be limited to the low frequency range by applying a low-pass filter, downsampling to the low frequency range, or other methods. The noise may be limited to the narrowband range.

At step 1506, the low frequency noise may be added to the input audio signal and ground truth audio signal to generate a noisy input audio signal and noisy ground truth audio signal. The low frequency noise may modify a low frequency portion of the input audio signal and ground truth audio signal, and a high frequency portion of the ground truth audio signal may be unmodified.

At step 1508, the noisy input audio signal and noisy ground truth audio signal are used for training an audio super resolution model.

Figure 16:
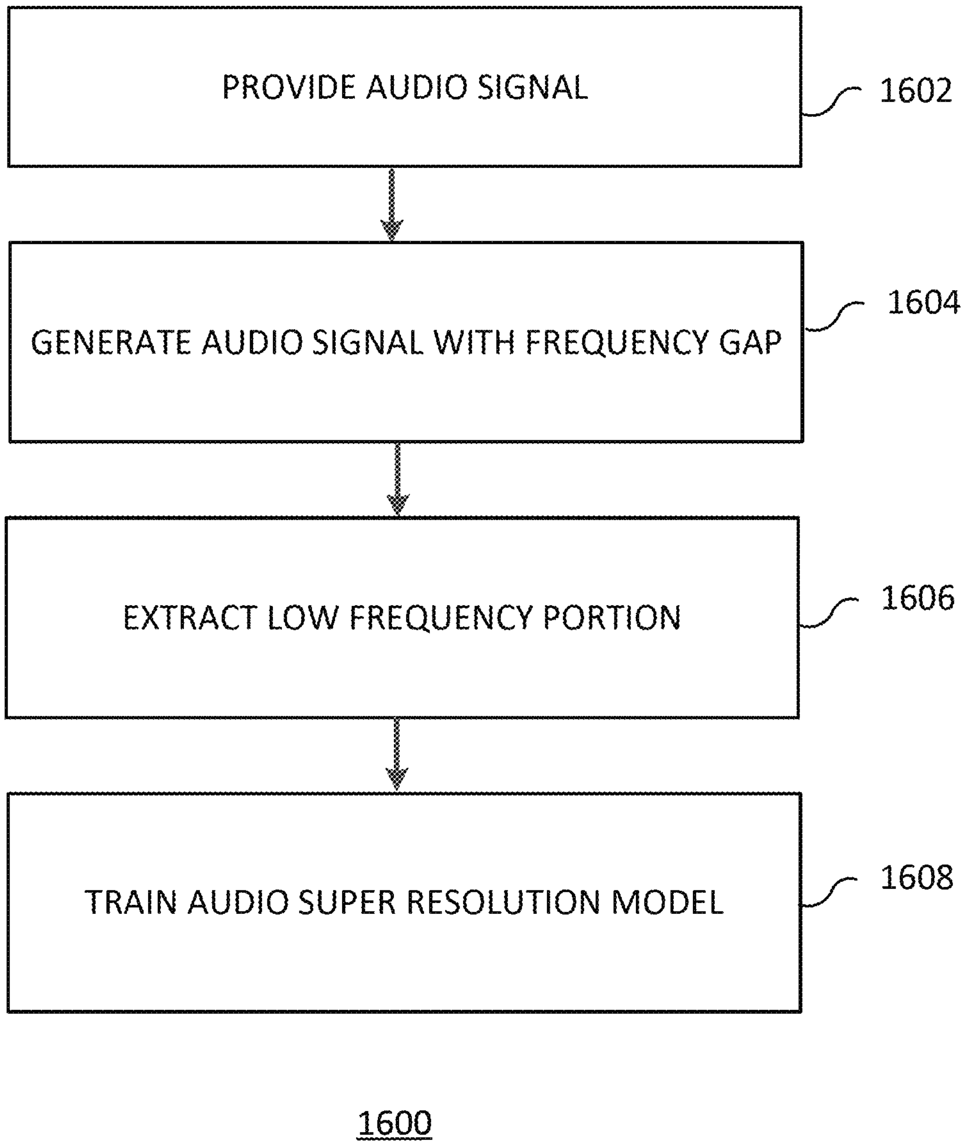
FIG. 16 illustrates an exemplary method that may be performed in some embodiments.

FIG. 16 illustrates an exemplary method 1600 that may be performed in some embodiments.

At step 1602, a ground truth audio signal is provided. The ground truth audio signal may include audio in a wide frequency range. In one embodiment, the ground truth audio signal has a frequency range of 8 kHz.

At step 1604, the ground truth audio signal is filtered to generate a modified ground truth audio signal with a frequency gap. In one embodiment, a low-pass filter or band-stop filter is applied to the ground truth audio signal and a fade out effect is added to a low frequency portion of the ground truth audio signal. The modified ground truth audio signal includes audio content in a low frequency portion and a high frequency portion and a frequency gap between the audio content in the low frequency portion and high frequency portion.

At step 1606, a low frequency portion of the modified ground truth audio signal is extracted to generate an input audio signal. In one embodiment, the low frequency portion comprises a portion of the modified ground truth audio signal that is below a frequency threshold. In one embodiment, the generated input audio signal has a frequency range of 4 kHz.

At step 1608, the input audio signal and modified ground truth audio signal are used for training an audio super resolution model. The input audio signal and modified ground truth audio signal may comprise a training sample pair used to train the audio super resolution model using a GAN.

Exemplary Computer System

Figure 17:
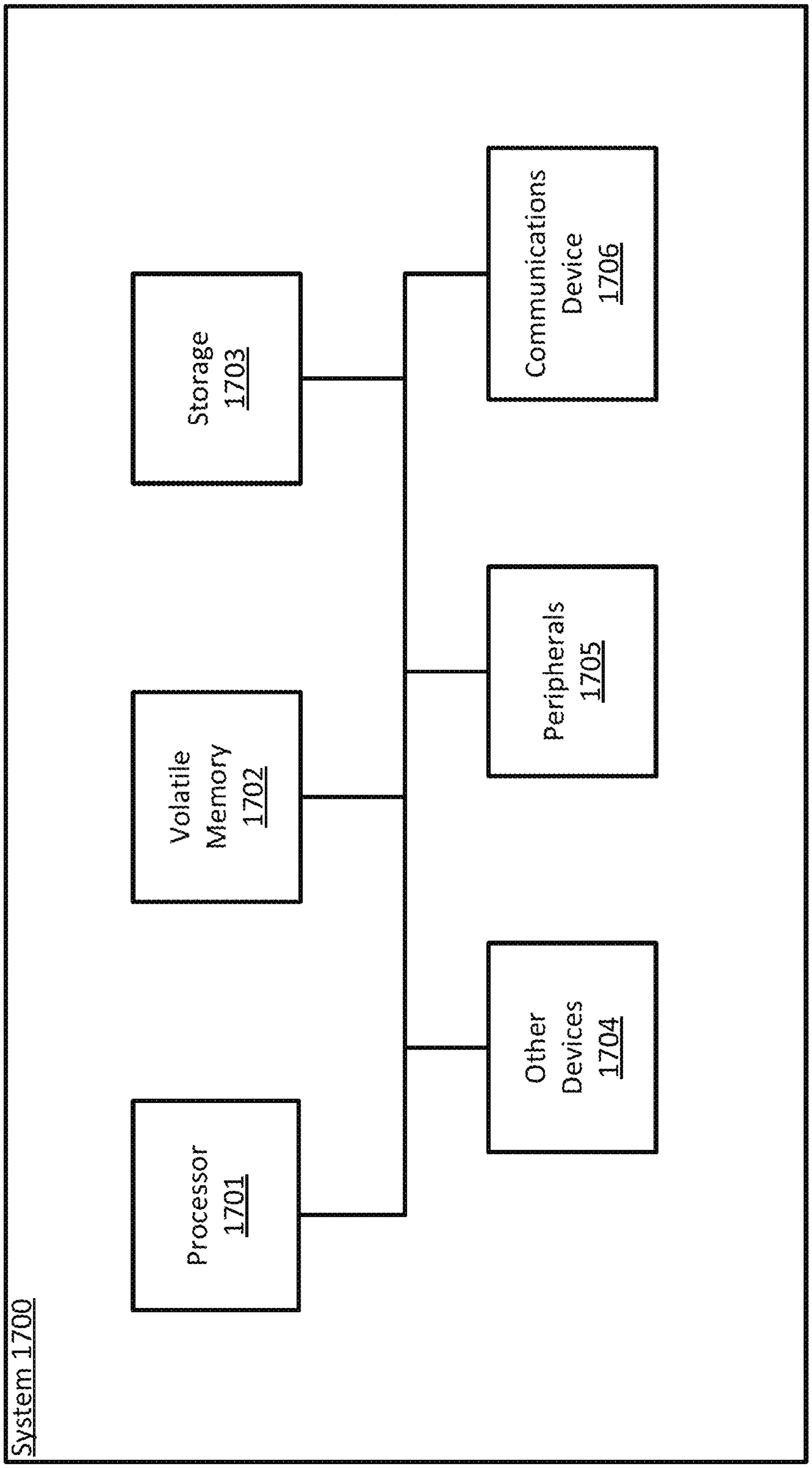
FIG. 17 is a diagram illustrating an exemplary computer that may perform processing in some embodiments.

FIG. 17 is a diagram illustrating an exemplary computer that may perform processing in some embodiments. Exemplary computer 1700 may perform operations consistent with some embodiments. The architecture of computer 1700 is exemplary. Computers can be implemented in a variety of other ways. A wide variety of computers can be used in accordance with the embodiments herein.

Processor 1701 may perform computing functions such as running computer programs. The volatile memory 1702 may provide temporary storage of data for the processor 1701. RAM is one kind of volatile memory. Volatile memory typically requires power to maintain its stored information. Storage 1703 provides computer storage for data, instructions, and/or arbitrary information. Non-volatile memory, which can preserve data even when not powered and including disks and flash memory, is an example of storage. Storage 1703 may be organized as a file system, database, or in other ways. Data, instructions, and information may be loaded from storage 1703 into volatile memory 1702 for processing by the processor 1701.

The computer 1700 may include peripherals 1705. Peripherals 1705 may include input peripherals such as a keyboard, mouse, trackball, video camera, microphone, and other input devices. Peripherals 1705 may also include output devices such as a display. Peripherals 1705 may include removable media devices such as CD-R and DVD-R recorders/players. Communications device 1706 may connect the computer 1700 to an external medium. For example, communications device 1706 may take the form of a network adapter that provides communications to a network. A computer 1700 may also include a variety of other devices 1704. The various components of the computer 1700 may be connected by a connection medium such as a bus, crossbar, or network.

It will be appreciated that the present disclosure may include any one and up to all of the following examples.

Example 1: A method comprising: receiving an audio signal; determining a sampling rate of the audio signal and comparing the sampling rate to a sampling rate threshold; determining a frequency range of the audio signal and comparing the frequency range to a frequency range threshold; when the sampling rate is below the sampling rate threshold or the frequency range is below the frequency range threshold, inputting the audio signal to an audio super resolution model comprising a neural network; processing the audio signal by the audio super resolution model to generate a synthetic audio signal with a wider frequency range than the frequency range of the audio signal.

Example 2: The method of Example 1, wherein the synthetic audio signal includes a low frequency portion and a high frequency portion, the audio signal includes a low frequency portion, and the low frequency portion of the synthetic audio signal is the same as the low frequency portion of the audio signal.

Example 3: The method of any of Examples 1-2, wherein the synthetic audio signal includes a low frequency portion, a high frequency portion, and a frequency gap comprising a frequency range between the low frequency portion and the high frequency portion without audio content.

Example 4: The method of any of Examples 1-3, further comprising: determining, by the audio super resolution model, that first content in the audio signal comprises noise and that second content in the audio signal comprises non-noise; generating, by the audio super resolution model, a corresponding high frequency audio signal portion for the second content and not the first content.

Example 5: The method of any of Examples 1-4, further comprising: determining that the frequency range is below the frequency range threshold by computing the ratio between the energy of a low frequency portion of the audio signal, comprising content below the frequency range threshold, to the total energy of the audio signal.

Example 6: The method of any of Examples 1-5, wherein the audio super resolution model comprises a convolutional neural network (CNN) including at least one encoder layer and at least one decoder layer.

Example 7: The method of any of Examples 1-6, wherein the audio super resolution model is trained using a generative adversarial network (GAN), the GAN including a discriminator network that evaluates a generated audio signal of the audio super resolution model to determine whether the generated audio signal comprises real-world data or generated data.

Example 8: The method of any of Examples 1-7, wherein the audio super resolution model is trained by using one or more training samples, each training sample comprising an input audio signal and a ground truth audio signal.

Example 9: The method of any of Examples 1-8, wherein each training sample is generated by applying a filter, downsampling, or applying a codec to the ground truth audio signal to extract a low frequency portion of the ground truth audio signal to create the input audio signal.

Example 10: The method of any of Examples 1-9, wherein the audio super resolution model is trained by using one or more noisy training samples, each noisy training sample comprising a noisy input audio signal and a noisy ground truth audio signal, the noisy input audio signal generated by adding noise in a low frequency portion of an input audio signal and the noisy ground truth audio signal generated by adding noise in a low frequency portion of the ground truth audio signal and not adding noise in a high frequency portion of the ground truth audio signal.

Example 11: The method of any of Examples 1-10, wherein the audio super resolution model is trained by using one or more modified training samples, each modified training sample comprising an input audio signal and a modified ground truth audio signal, the modified ground truth audio signal generated by applying a filter to a ground truth audio signal to create a frequency gap without audio content below a frequency threshold, the modified ground truth audio signal including audio content in a frequency range below the frequency gap and in a frequency range above the frequency gap, and the input audio signal generated by extracting a low frequency portion of the modified ground truth audio signal.

Example 12: The method of any of Examples 1-11, wherein the audio super resolution model is trained based on a spectral reconstruction loss function.

Example 13: The method of any of Examples 1-12, wherein the audio super resolution model is trained based on a timescale reconstruction loss function.

Example 14: The method of any of Examples 1-13, wherein the low frequency portion comprises the portion in the range of 0 to 4 kHz and the high frequency portion comprises the portion in the range of 4 kHz to 8 kHz.

Example 15: The method of any of Examples 1-14, wherein the audio signal comprises a 4 kHz frequency range signal and the synthetic audio signal comprises an 8 kHz frequency range signal.

Example 16: A non-transitory computer readable medium that stores executable program instructions that when executed by one or more computing devices configure the one or more computing devices to perform operations comprising: receiving an audio signal; determining a sampling rate of the audio signal and comparing the sampling rate to a sampling rate threshold; determining a frequency range of the audio signal and comparing the frequency range to a frequency range threshold; when the sampling rate is below the sampling rate threshold or the frequency range is below the frequency range threshold, inputting the audio signal to an audio super resolution model comprising a neural network; processing the audio signal by the audio super resolution model to generate a synthetic audio signal with a wider frequency range than the frequency range of the audio signal.

Example 17: The non-transitory computer readable medium of Example 16, wherein the synthetic audio signal includes a low frequency portion and a high frequency portion, the audio signal includes a low frequency portion, and the low frequency portion of the synthetic audio signal is the same as the low frequency portion of the audio signal.

Example 18: The non-transitory computer readable medium of any of Examples 16-17, wherein the synthetic audio signal includes a low frequency portion, a high frequency portion, and a frequency gap comprising a frequency range between the low frequency portion and the high frequency portion without audio content.

Example 19: The non-transitory computer readable medium of any of Examples 16-18, wherein the executable program instructions further configure the one or more computing devices to perform operations comprising: determining, by the audio super resolution model, that first content in the audio signal comprises noise and that second content in the audio signal comprises non-noise; generating, by the audio super resolution model, a corresponding high frequency audio signal portion for the second content and not the first content.

Example 20: The non-transitory computer readable medium of any of Examples 16-19, wherein the executable program instructions further configure the one or more computing devices to perform operations comprising: determining that the frequency range is below the frequency range threshold by computing the ratio between the energy of a low frequency portion of the audio signal, comprising content below the frequency range threshold, to the total energy of the audio signal.

Example 21: The non-transitory computer readable medium of any of Examples 16-20, wherein the audio super resolution model comprises a CNN including at least one encoder layer and at least one decoder layer.

Example 22: The non-transitory computer readable medium of any of Examples 16-21, wherein the audio super resolution model is trained using a GAN, the GAN including a discriminator network that evaluates a generated audio signal of the audio super resolution model to determine whether the generated audio signal comprises real-world data or generated data.

Example 23: The non-transitory computer readable medium of any of Examples 16-22, wherein the audio super resolution model is trained by using one or more training samples, each training sample comprising an input audio signal and a ground truth audio signal.

Example 24: The non-transitory computer readable medium of any of Examples 16-23, wherein each training sample is generated by applying a filter, downsampling, or applying a codec to the ground truth audio signal to extract a low frequency portion of the ground truth audio signal to create the input audio signal.

Example 25: The non-transitory computer readable medium of any of Examples 16-24, wherein the audio super resolution model is trained by using one or more noisy training samples, each noisy training sample comprising a noisy input audio signal and a noisy ground truth audio signal, the noisy input audio signal generated by adding noise in a low frequency portion of an input audio signal and the noisy ground truth audio signal generated by adding noise in a low frequency portion of the ground truth audio signal and not adding noise in a high frequency portion of the ground truth audio signal.

Example 26: The non-transitory computer readable medium of any of Examples 16-25, wherein the audio super resolution model is trained by using one or more modified training samples, each modified training sample comprising an input audio signal and a modified ground truth audio signal, the modified ground truth audio signal generated by applying a filter to a ground truth audio signal to create a frequency gap without audio content below a frequency threshold, the modified ground truth audio signal including audio content in a frequency range below the frequency gap and in a frequency range above the frequency gap, and the input audio signal generated by extracting a low frequency portion of the modified ground truth audio signal.

Example 27: The non-transitory computer readable medium of any of Examples 16-26, wherein the audio super resolution model is trained based on a spectral reconstruction loss function.

Example 28: The non-transitory computer readable medium of any of Examples 16-27, wherein the audio super resolution model is trained based on a timescale reconstruction loss function.

Example 29: The non-transitory computer readable medium of any of Examples 16-28, wherein the low frequency portion comprises the portion in the range of 0 to 4 kHz and the high frequency portion comprises the portion in the range of 4 kHz to 8 kHz.

Example 30: The non-transitory computer readable medium of any of Examples 16-29, wherein the audio signal comprises a 4 kHz frequency range signal and the synthetic audio signal comprises an 8 kHz frequency range signal.

Example 31: A system comprising one or more processors configured to perform the operations of: receiving an audio signal; determining a sampling rate of the audio signal and comparing the sampling rate to a sampling rate threshold; determining a frequency range of the audio signal and comparing the frequency range to a frequency range threshold; when the sampling rate is below the sampling rate threshold or the frequency range is below the frequency range threshold, inputting the audio signal to an audio super resolution model comprising a neural network; processing the audio signal by the audio super resolution model to generate a synthetic audio signal with a wider frequency range than the frequency range of the audio signal.

Example 32: The system of Example 31, wherein the synthetic audio signal includes a low frequency portion and a high frequency portion, the audio signal includes a low frequency portion, and the low frequency portion of the synthetic audio signal is the same as the low frequency portion of the audio signal.

Example 33: The system of any of Examples 31-32, wherein the synthetic audio signal includes a low frequency portion, a high frequency portion, and a frequency gap comprising a frequency range between the low frequency portion and the high frequency portion without audio content.

Example 34: The system of any of Examples 31-33, wherein the processors are further configured to perform the operations of: determining, by the audio super resolution model, that first content in the audio signal comprises noise and that second content in the audio signal comprises non-noise; generating, by the audio super resolution model, a corresponding high frequency audio signal portion for the second content and not the first content.

Example 35: The system of any of Examples 31-34, wherein the processors are further configured to perform the operations of: determining that the frequency range is below the frequency range threshold by computing the ratio between the energy of a low frequency portion of the audio signal, comprising content below the frequency range threshold, to the total energy of the audio signal.

Example 36: The system of any of Examples 31-35, wherein the audio super resolution model comprises a CNN including at least one encoder layer and at least one decoder layer.

Example 37: The system of any of Examples 31-36, wherein the audio super resolution model is trained using a GAN, the GAN including a discriminator network that evaluates a generated audio signal of the audio super resolution model to determine whether the generated audio signal comprises real-world data or generated data.

Example 38: The system of any of Examples 31-37, wherein the audio super resolution model is trained by using one or more training samples, each training sample comprising an input audio signal and a ground truth audio signal.

Example 39: The system of any of Examples 31-38, wherein each training sample is generated by applying a filter, downsampling, or applying a codec to the ground truth audio signal to extract a low frequency portion of the ground truth audio signal to create the input audio signal.

Example 40: The system of any of Examples 31-39, wherein the audio super resolution model is trained by using one or more noisy training samples, each noisy training sample comprising a noisy input audio signal and a noisy ground truth audio signal, the noisy input audio signal generated by adding noise in a low frequency portion of an input audio signal and the noisy ground truth audio signal generated by adding noise in a low frequency portion of the ground truth audio signal and not adding noise in a high frequency portion of the ground truth audio signal.

Example 41: The system of any of Examples 31-40, wherein the audio super resolution model is trained by using one or more modified training samples, each modified training sample comprising an input audio signal and a modified ground truth audio signal, the modified ground truth audio signal generated by applying a filter to a ground truth audio signal to create a frequency gap without audio content below a frequency threshold, the modified ground truth audio signal including audio content in a frequency range below the frequency gap and in a frequency range above the frequency gap, and the input audio signal generated by extracting a low frequency portion of the modified ground truth audio signal.

Example 42: The system of any of Examples 31-41, wherein the audio super resolution model is trained based on a spectral reconstruction loss function.

Example 43: The system of any of Examples 31-42, wherein the audio super resolution model is trained based on a timescale reconstruction loss function.

Example 44: The system of any of Examples 31-43, wherein the low frequency portion comprises the portion in the range of 0 to 4 kHz and the high frequency portion comprises the portion in the range of 4 kHz to 8 kHz.

Example 45: The system of any of Examples 31-44, wherein the audio signal comprises a 4 kHz frequency range signal and the synthetic audio signal comprises an 8 kHz frequency range signal.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:

receiving an audio signal from a first client device during a virtual conference, a plurality of client devices connected to the virtual conference;

determining an energy of a portion of the audio signal;

after determining that a ratio of the energy of the portion of the audio signal to a total energy of the audio signal exceeds a threshold, performing audio super-resolution, performing audio super-resolution comprising:

inputting the audio signal to an audio super resolution model comprising a neural network, one or more encoder blocks, and one or more decoder blocks, the one or more encoder blocks configured to down-sample the audio signal and provide the down-sampled audio signal to the neural network, and the one or more decoder blocks configured to up-sample an output of the neural network;

generating, by the audio super resolution model, a synthetic audio signal based on the audio signal, wherein the synthetic audio signal comprises a wider frequency range than the frequency range of the audio signal; and transmitting the synthetic audio signal to each other client device of the plurality of client devices instead of the audio signal.

2. The method of claim 1, wherein the synthetic audio signal includes a low frequency portion and a high frequency portion, the audio signal includes a low frequency portion, and the low frequency portion of the synthetic audio signal is the same as the low frequency portion of the audio signal.

3. The method of claim 1, wherein the synthetic audio signal includes a low frequency portion, a high frequency portion, and a frequency gap comprising a frequency range between the low frequency portion and the high frequency portion without audio content.

4. The method of claim 1, further comprising:

determining, by the audio super resolution model, that first content in the audio signal comprises noise and that second content in the audio signal comprises non-noise; and generating, by the audio super resolution model, a corresponding high frequency audio signal portion for the second content and not the first content.

5. The method of claim 1, wherein the portion of the audio signal comprises a low frequency portion of the audio signal below a frequency range threshold, and further comprising:

determining that a frequency range is below a frequency range threshold based on the ratio.

6. The method of claim 1, wherein the audio super resolution model comprises a convolutional neural network (CNN) including at least one encoder layer and at least one decoder layer.

7. The method of claim 1, wherein the audio super resolution model is trained using a generative adversarial network (GAN), the GAN including a discriminator network that evaluates a generated audio signal of the audio super resolution model to determine whether the generated audio signal comprises real-world data or generated data.

8. A non-transitory computer readable medium comprising processor-executable program instructions configured to cause one or more processors to:

receive an audio signal from a first client device during a virtual conference, a plurality of client devices connected to the virtual conference;

determine an energy of a portion of the audio signal;

after determining that a ratio of the energy of the portion of the audio signal to a total energy of the audio signal exceeds a threshold, perform audio super-resolution, performing audio super-resolution comprising:

input the audio signal to an audio super resolution model comprising a neural network, one or more encoder blocks, and one or more decoder blocks, the one or more encoder blocks configured to down-sample the audio signal and provide the down-sampled audio signal to the neural network, and the one or more decoder blocks configured to up-sample an output of the neural network;

generate, by the audio super resolution model, a synthetic audio signal based on the audio signal, wherein the synthetic audio signal comprises a wider frequency range than the frequency range of the audio signal; and transmit the synthetic audio signal to each other client device of the plurality of client devices instead of the audio signal.

9. The non-transitory computer readable medium of claim 8, wherein the synthetic audio signal includes a low frequency portion and a high frequency portion, the audio signal includes a low frequency portion, and the low frequency portion of the synthetic audio signal is the same as the low frequency portion of the audio signal.

10. The non-transitory computer readable medium of claim 8, wherein the synthetic audio signal includes a low frequency portion, a high frequency portion, and a frequency gap comprising a frequency range between the low frequency portion and the high frequency portion without audio content.

11. The non-transitory computer readable medium of claim 8, further comprising processor-executable program instructions configured to cause the one or more processors to:

determine, by the audio super resolution model, that first content in the audio signal comprises noise and that second content in the audio signal comprises non-noise; and generate, by the audio super resolution model, a corresponding high frequency audio signal portion for the second content and not the first content.

12. The non-transitory computer readable medium of claim 8, wherein the portion of the audio signal comprises a low frequency portion of the audio signal below a frequency range threshold, and further comprising processor-executable program instructions configured to cause the one or more processors to: determine that a frequency range is below a frequency range threshold based on the ratio.

13. The non-transitory computer readable medium of claim 8, wherein the audio super resolution model comprises a CNN including at least one encoder layer and at least one decoder layer.

14. The non-transitory computer readable medium of claim 8, wherein the audio super resolution model is trained using a GAN, the GAN including a discriminator network that evaluates a generated audio signal of the audio super resolution model to determine whether the generated audio signal comprises real-world data or generated data.

15. A system comprising:

a non-transitory computer-readable medium; and one or more processors communicatively coupled to the non-transitory computer-readable medium, the one or more processors configured to execute processor-executable instructions stored in the non-transitory computer-readable medium to:

receive an audio signal from a first client device during a virtual conference, a plurality of client devices connected to the virtual conference;
determine an energy of a portion of the audio signal;
after determining that a ratio of the energy of the portion of the audio signal to a total energy of the audio signal exceeds a threshold, perform audio super-resolution, performing audio super-resolution comprising:
input the audio signal to an audio super resolution model comprising a neural network, one or more encoder blocks, and one or more decoder blocks, the one or more encoder blocks configured to down-sample the audio signal and provide the down-sampled audio signal to the neural network, and the one or more decoder blocks configured to up-sample an output of the neural network;
generate, by the audio super resolution model, a synthetic audio signal based on the audio signal, wherein the synthetic audio signal comprises a wider frequency range than the frequency range of the audio signal; and
transmit the synthetic audio signal to each other client device of the plurality of client devices instead of the audio signal.

16. The system of claim 15, wherein the synthetic audio signal includes a low frequency portion and a high frequency portion, the audio signal includes a low frequency portion, and the low frequency portion of the synthetic audio signal is the same as the low frequency portion of the audio signal.

17. The system of claim 15, wherein the synthetic audio signal includes a low frequency portion, a high frequency portion, and a frequency gap comprising a frequency range between the low frequency portion and the high frequency portion without audio content.

18. The system of claim 15, wherein the one or more processors are configured to execute further processor-executable instructions configured to cause the one or more processors to:
determine, by the audio super resolution model, that first content in the audio signal comprises noise and that second content in the audio signal comprises non-noise; and
generate, by the audio super resolution model, a corresponding high frequency audio signal portion for the second content and not the first content.

19. The system of claim 15, wherein the portion of the audio signal comprises a low frequency portion of the audio signal below a frequency range threshold and wherein the one or more processors are configured to execute further processor-executable instructions configured to cause the one or more processors to:
determine that a frequency range is below a frequency range threshold based on the ratio.

20. The system of claim 15, wherein the audio super resolution model comprises a CNN including at least one encoder layer and at least one decoder layer.

* * * * *